(12) United States Patent
Ueda et al.

(10) Patent No.: US 12,104,534 B2
(45) Date of Patent: Oct. 1, 2024

(54) HEAT EXCHANGER FOR AIRCRAFT ENGINE

(71) Applicant: Sumitomo Precision Products Co., Ltd., Amagasaki (JP)

(72) Inventors: Tatsuya Ueda, Amagasaki (JP); Sachio Nagamitsu, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 919 days.

(21) Appl. No.: 16/977,496

(22) PCT Filed: Mar. 5, 2019

(86) PCT No.: PCT/JP2019/008518
§ 371 (c)(1),
(2) Date: Sep. 2, 2020

(87) PCT Pub. No.: WO2019/172221
PCT Pub. Date: Sep. 12, 2019

(65) Prior Publication Data
US 2021/0054787 A1 Feb. 25, 2021

(30) Foreign Application Priority Data
Mar. 5, 2018 (JP) ................................ 2018-038980

(51) Int. Cl.
F02C 7/18 (2006.01)
F28D 1/03 (2006.01)
F28F 3/12 (2006.01)

(52) U.S. Cl.
CPC ............. *F02C 7/18* (2013.01); *F28D 1/03* (2013.01); *F28F 3/12* (2013.01)

(58) Field of Classification Search
CPC ...... F02C 7/18; F28D 1/03; F28D 2021/0021; F28F 3/12; F28F 3/022; F28F 3/025; Y02T 50/60; F05D 2250/18; F05D 2260/213; F05D 2260/22141; F02K 3/115
See application file for complete search history.

(56) References Cited

U.S. PATENT DOCUMENTS

| 9,273,632 | B2 | 3/2016 | Ueda |
| 9,732,702 | B2 | 8/2017 | Ueda |
| 10,156,404 | B2 * | 12/2018 | Ueda ............... F28D 1/0308 |
| 2005/0247432 | A1 * | 11/2005 | Bhatti et al. ........... F28F 3/04 |
| | | | 165/80.3 |

FOREIGN PATENT DOCUMENTS

| JP | H11193995 A * | 7/1999 | ............. F28F 3/022 |
| JP | 5442916 B1 | 3/2014 | |

OTHER PUBLICATIONS

JPH11193995A Translation (Year: 1999).*

(Continued)

*Primary Examiner* — Elizabeth J Martin
*Assistant Examiner* — Dario Antonio Deleon
(74) *Attorney, Agent, or Firm* — Crowell & Moring LLP

(57) ABSTRACT

A heat exchanger (100) for an aircraft engine includes a core (1) and radiating fins (2). The radiating fins are configured such that a ratio y/Y of a height y from a surface (10) of the core to a formation position of a connecting portion (23) to a total height Y of each of the radiating fins (2) from the surface of the core satisfies a relationship of $0.34<y/Y<0.64$.

11 Claims, 13 Drawing Sheets

(56) References Cited

OTHER PUBLICATIONS

International Search Report (PCT/ISA/210) issued in PCT Application No. PCT/JP2019/008518 dated May 28, 2019 with English translation (four pages).
Japanese-language Written Opinion (PCT/ISA/237) issued in PCT Application No. PCT/JP2019/008518 dated May 28, 2019 (three pages).

* cited by examiner (FIRST EMBODIMENT)

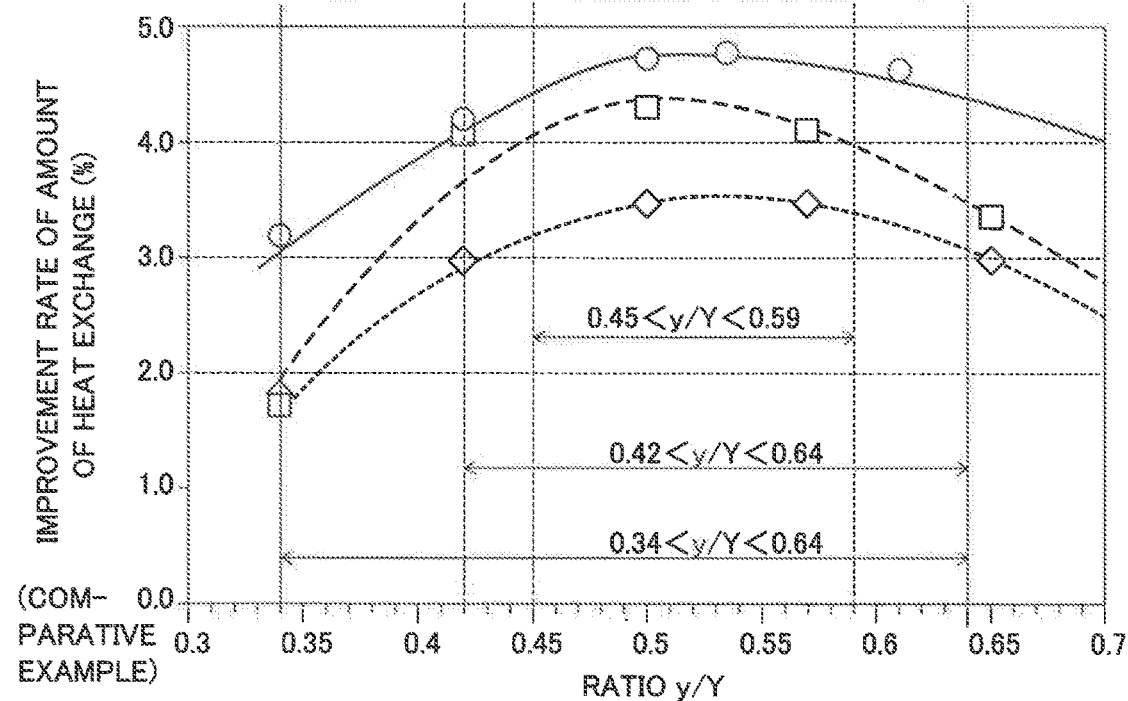
FIG.5 (FIRST EMBODIMENT) IMPROVEMENT RATE OF AMOUNT OF HEAT EXCHANGE WITH RESPECT TO RATIO y/Y (X/x=2.2, h/Y=0)
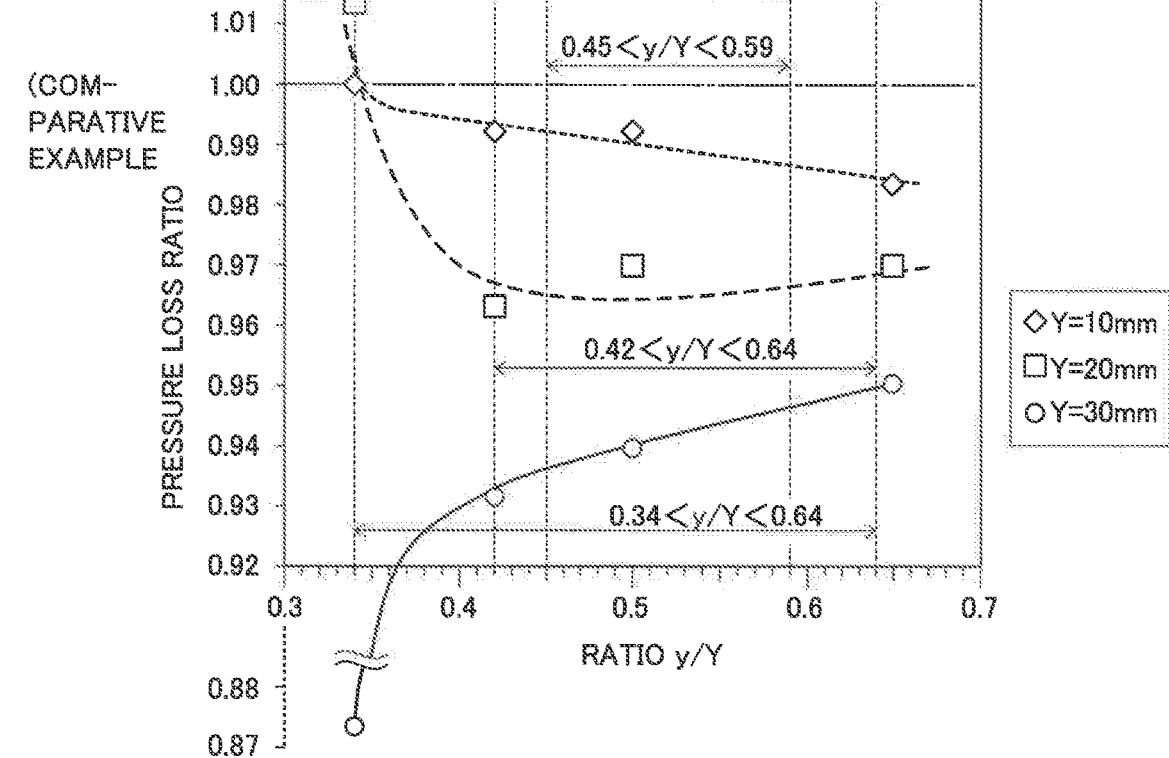
FIG.6 (FIRST EMBODIMENT) CHANGE IN PRESSURE LOSS WITH RESPECT TO RATIO y/Y (X/x=2.2, h/Y=0)

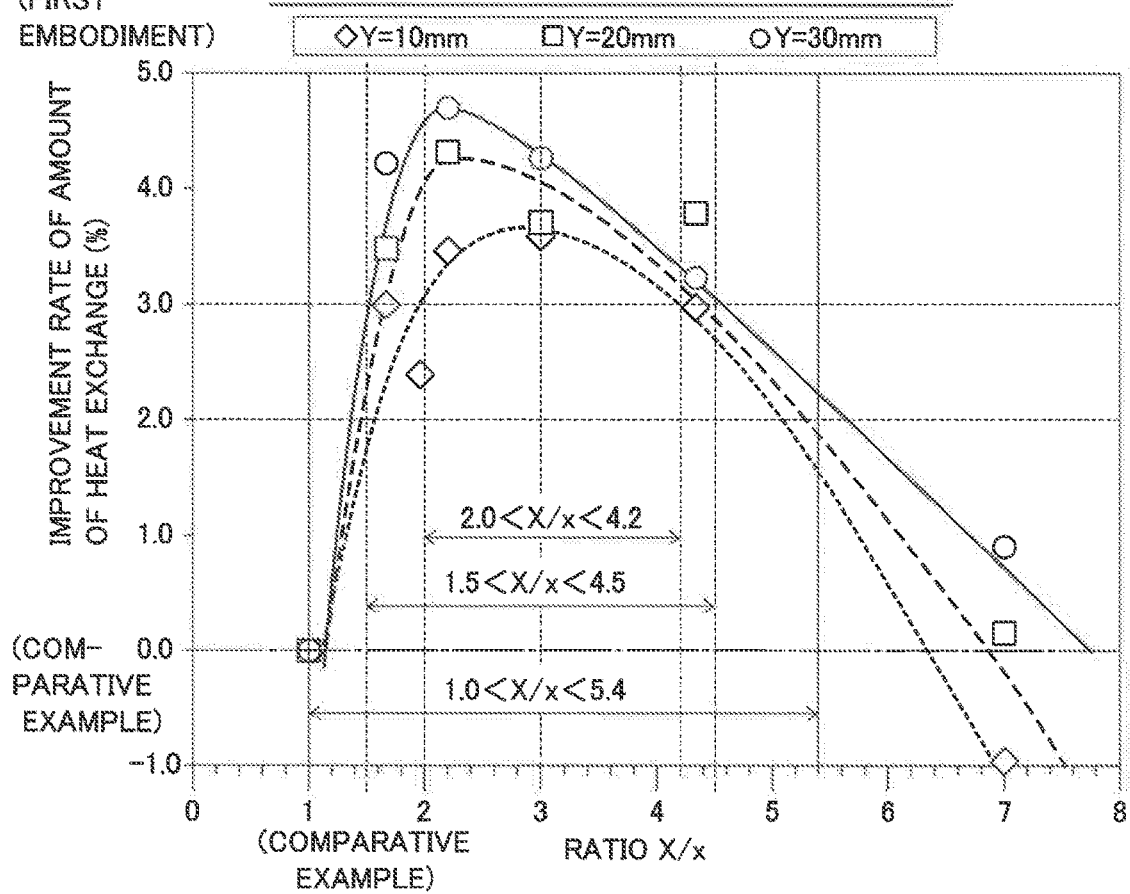
FIG.7 (FIRST EMBODIMENT)
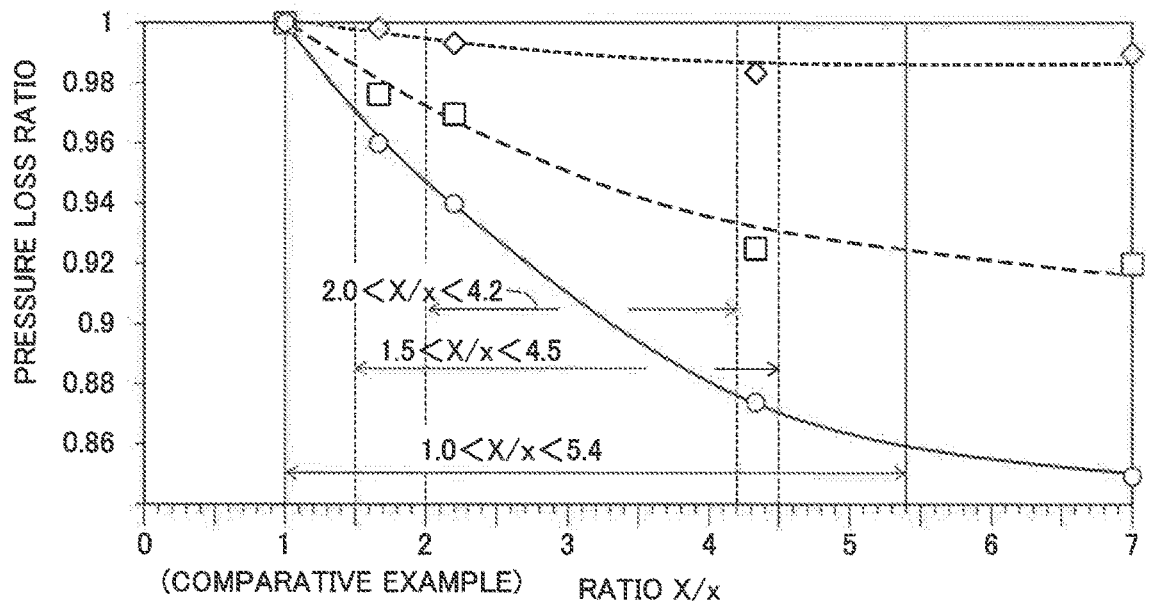
FIG.8 (FIRST EMBODIMENT)
(COMPARATIVE EXAMPLE)

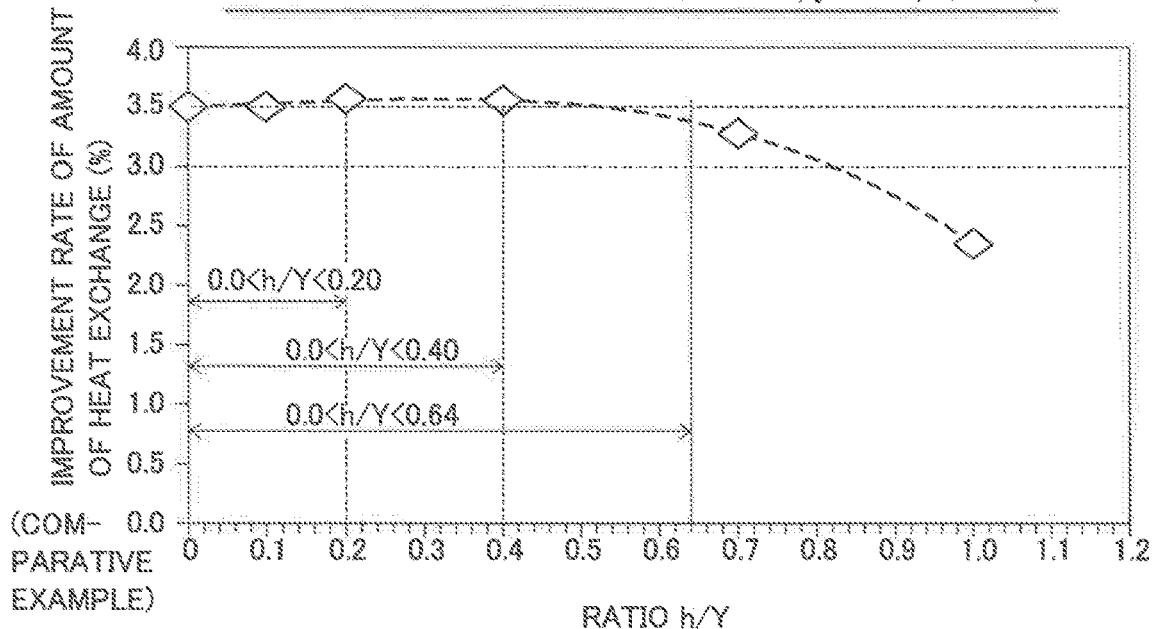
FIG.9 (FIRST EMBODIMENT) IMPROVEMENT RATE OF AMOUNT OF HEAT EXCHANGE WITH RESPECT TO RATIO h/Y (Y=20mm, y/Y=0.5, X/x=2.2)
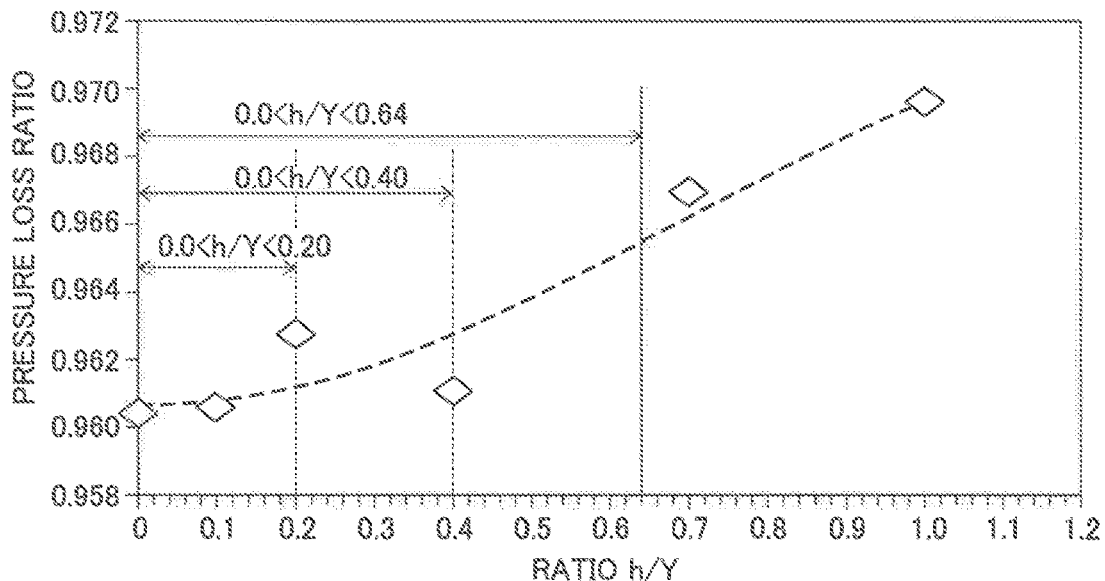
FIG.10 (FIRST EMBODIMENT) CHANGE IN PRESSURE LOSS WITH RESPECT TO RATIO h/Y (Y=20mm, y/Y=0.5, X/x=2.2)

(RADIATING FIN OF COMPARATIVE EXAMPLE)

(FIRST EMBODIMENT)

(SECOND EMBODIMENT)

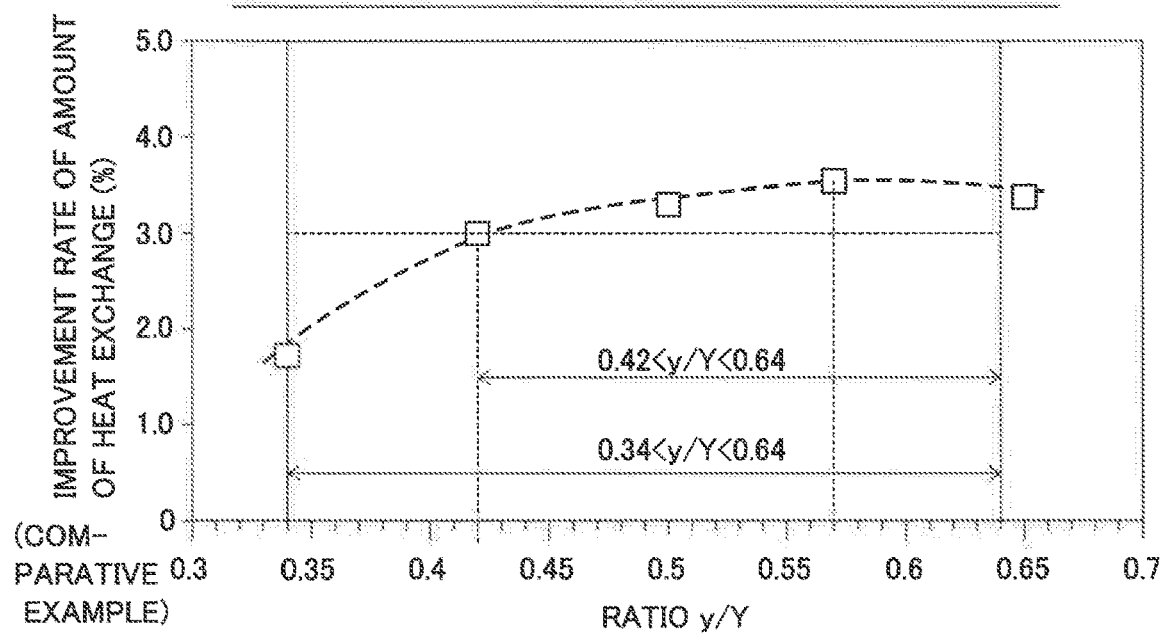
FIG.14 (SECOND EMBODIMENT) IMPROVEMENT RATE OF AMOUNT OF HEAT EXCHANGE WITH RESPECT TO RATIO y/Y (Y=20mm, X/x=2.2, h/Y=0)
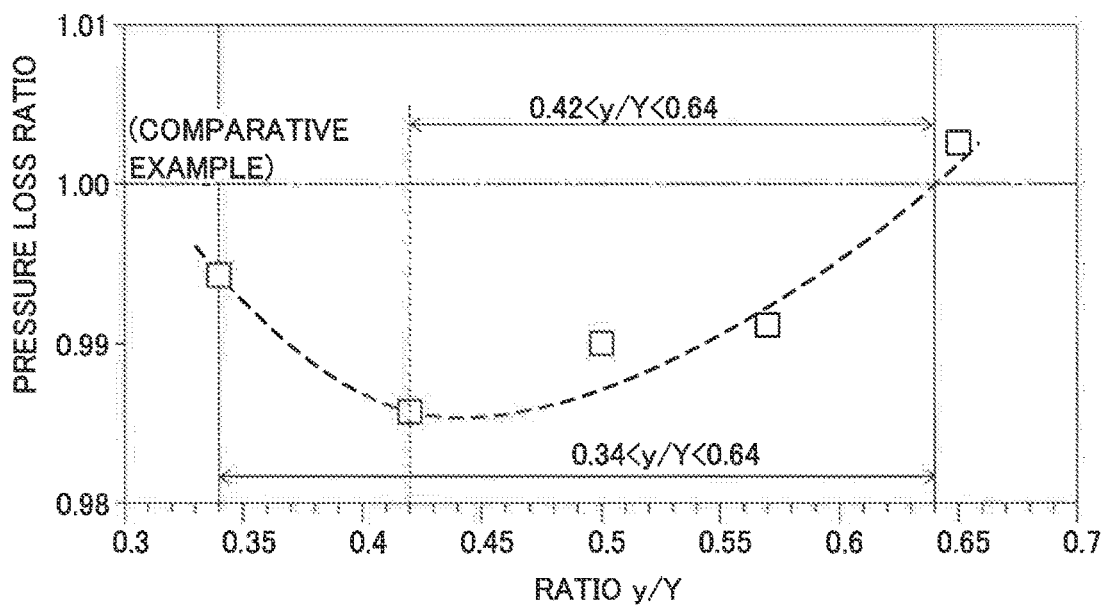
FIG.15 (SECOND EMBODIMENT)
CHANGE IN PRESSURE LOSS WITH RESPECT TO RATIO y/Y (Y=20mm, X/x=2.2, h/Y=0)

(SECOND EMBODIMENT) IMPROVEMENT RATE OF AMOUNT OF HEAT EXCHANGE WITH RESPECT TO RATIO X/x (Y=20mm, y/Y=0.5, h/Y=0)

(SECOND EMBODIMENT)
(COMPARATIVE EXAMPLE)
CHANGE IN PRESSURE LOSS WITH RESPECT TO RATIO X/x (Y=20mm, y/Y=0.5, h/Y=0)

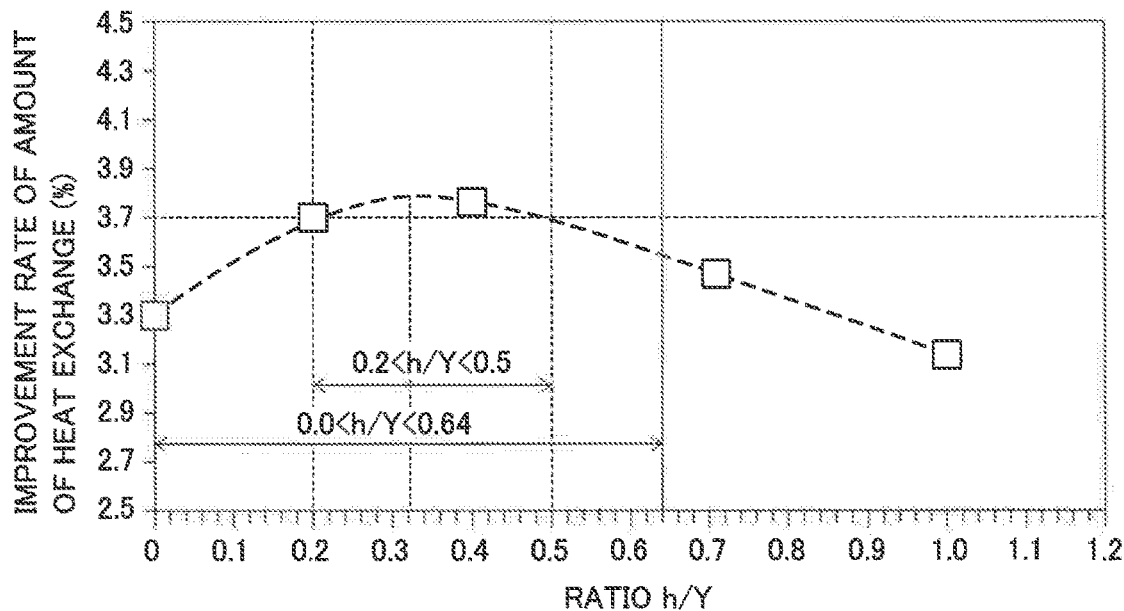
FIG.18 (SECOND EMBODIMENT) IMPROVEMENT RATE OF AMOUNT OF HEAT EXCHANGE WITH RESPECT TO RATIO h/Y (Y=20mm, y/Y=0.5, X/x=2.2)
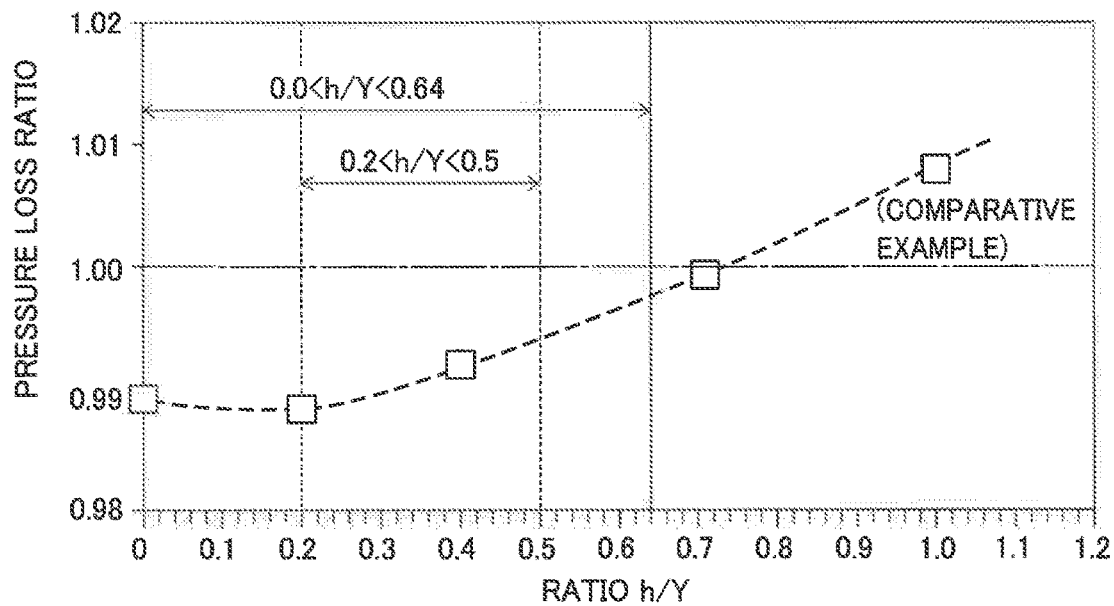
FIG.19 (SECOND EMBODIMENT) CHANGE IN PRESSURE LOSS WITH RESPECT TO RATIO h/Y (Y=20mm, y/Y=0.5, X/x=2.2)

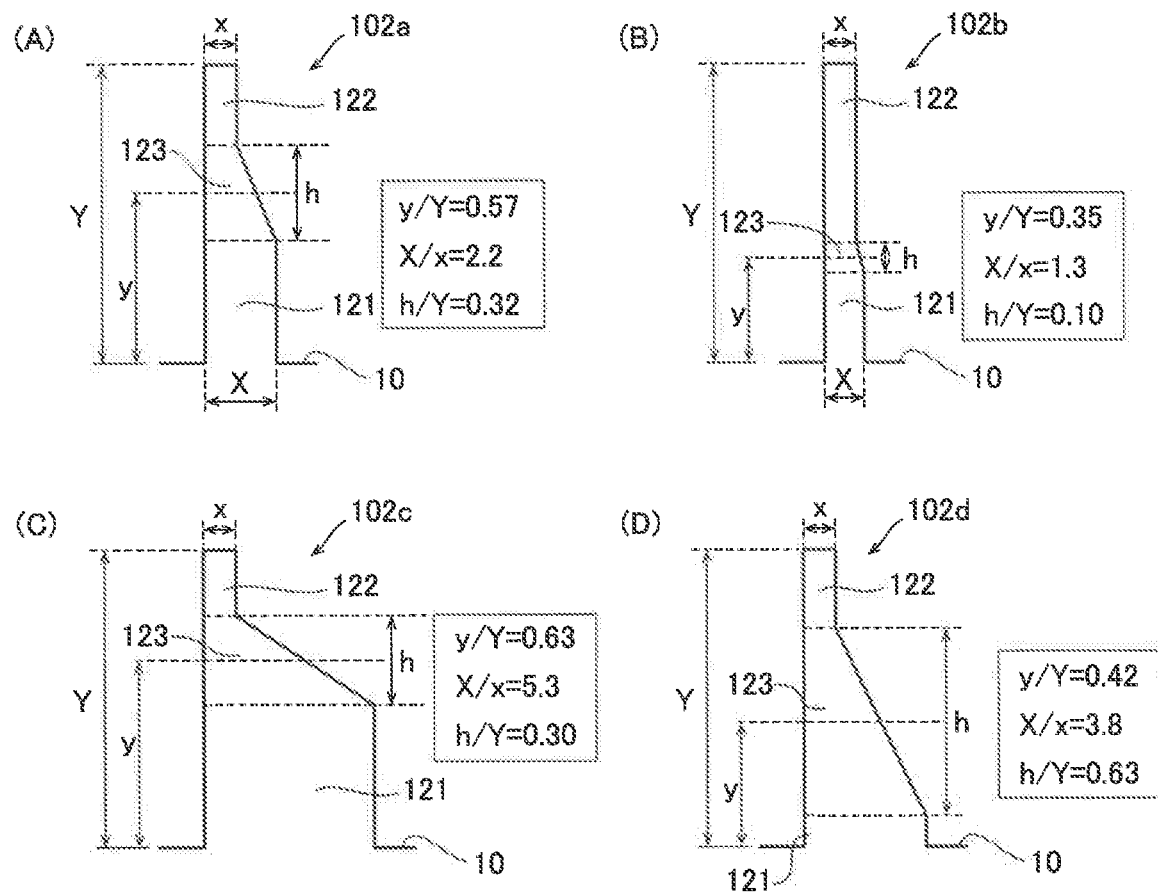

HEAT EXCHANGER FOR AIRCRAFT ENGINE

TECHNICAL FIELD

The present invention relates to a heat exchanger for an aircraft engine, and more particularly, it relates to a heat exchanger for an aircraft engine, including radiating fins.

BACKGROUND ART

Conventionally, a heat exchanger for an aircraft engine, including radiating fins is known. Such a heat exchanger for an aircraft engine is disclosed in Japanese Patent No. 5442916, for example.

Japanese Patent No. 5442916 discloses a heat exchanger for an aircraft engine, including a main body (core) configured to allow a fluid to be cooled to flow therethrough, and a plurality of radiating fins provided on the outer surface of the main body. This heat exchanger has a plate shape in which the main body is curved along a curved surface (such as the inner peripheral surface of a fan casing) inside the aircraft engine, cools the fluid to be cooled by exchanging heat with air that flows through the aircraft engine, and is called a surface cooler. Each radiating fin protrudes in the inward radial direction or the outward radial direction of the engine from a surface of the main body, and has a flat plate shape. The fluid to be cooled is a lubricating oil or the like circulated and supplied to an aircraft engine, a generator in an aircraft, or the like.

PRIOR ART

Patent Document

Patent Document 1: Japanese Patent No. 5442916

SUMMARY OF THE INVENTION

Problems to be Solved by the Invention

Although not described in Japanese Patent No. 5442916, in a heat exchanger for an aircraft, there are severe weight restrictions and dimensional restrictions, and working is constrained when radiating fins are actually formed. Thus, the heights of the radiating fins from a main body (core), the number of radiating fins (a pitch between the radiating fins), and the total weight of all the radiating fins are restricted. Therefore, it is difficult to improve (increase) the amount of heat exchange. Furthermore, even when the amount of heat exchange is improved (increased), the performance of an aircraft engine is affected when a pressure loss caused by each radiating fin increases, and thus it is also desired to improve the amount of heat exchange without increasing the pressure loss as compared with the conventional case.

The present invention has been proposed in order to solve the aforementioned problems, and one object of the present invention is to provide a heat exchanger for an aircraft engine capable of meeting weight restrictions and dimensional restrictions and improving (increasing) the amount of heat exchange without increasing a pressure loss.

Means for Solving the Problems

In order to attain the aforementioned object, as a result of earnest investigations, the inventors have found that paying attention to heat conduction inside radiating fins, the thickness of each of the radiating fins on the tip side is made different from that on the base side such that it is possible to improve the amount of heat exchange while meeting the weight restrictions and the dimensional restrictions of the radiating fins. The inventors have further found that the degree of improvement (increase) in the amount of heat exchange changes depending on a position of each of connecting portions at which the thickness of each of the radiating fins changes, and have derived an appropriate position range of each of the connecting portions. That is, a heat exchanger for an aircraft engine according to the present invention is configured to perform heat exchange with an airflow in the aircraft engine, and includes a core configured to allow a fluid to be cooled to flow therethrough, and a plurality of plate-shaped radiating fins on a surface of the core. Each of the radiating fins includes a first portion configured to rise from the surface of the core, a second portion arranged on a tip side relative to the first portion, the second portion having a thickness smaller than that of the first portion, and a connecting portion configured to connect between the first portion and the second portion, the connecting portion being inclined with respect to the first portion and the second portion, and the radiating fins are configured such that a ratio y/Y of a height y from the surface of the core to a formation position of the connecting portion to a total height Y of each of the radiating fins from the surface of the core satisfies a relationship of $0.34 < y/Y < 0.64$. The formation position of the connecting portion refers to the center position of the inclined connecting portion in a height direction thereof. Similarly, in a case in which a plurality of connecting portions are provided, the center position of each connecting portion in the height direction is the formation position.

In the heat exchanger for an aircraft engine according to the present invention, with the aforementioned configuration, the thickness of the first portion on the base side that contacts the high-temperature core can be relatively large to increase the amount of heat conduction inside each of the radiating fins. Therefore, the amount of heat exchange of the heat transfer fins can be increased. Furthermore, the thickness of the second portion on the tip side at which a sufficient amount of heat exchange can be obtained by a high-speed airflow in the aircraft engine can be relatively small to reduce a pressure loss while ensuring the amount of heat exchange. In addition, the radiating fins are configured such that the ratio y/Y satisfies the relationship of $0.34 < y/Y < 0.64$ based on the simulation results described below. Thus, the improvement effect of the amount of heat exchange of about 2% or more (about 1.8% or more) can be achieved as compared with a radiating fin having a rectangular cross-section with the same weight and the same height. Consequently, according to the present invention, it is possible to meet weight restrictions and dimensional restrictions and improve (increase) the amount of heat exchange without an increase in the pressure loss.

In the aforementioned heat exchanger for an aircraft engine according to the present invention, the radiating fins are preferably configured such that a ratio X/x of a thickness X of the first portion to a thickness x of the second portion satisfies a relationship of $1.0 < X/x < 5.4$. Accordingly, in addition to the aforementioned findings, the inventors have found that when the thickness ratio (X/x) of the thickness of the first portion to the thickness of the second portion is within a range of $1.0 < X/x < 5.4$, the amount of heat exchange is improved. Thus, it is possible to improve the amount of heat exchange without an increase in the pressure loss as compared with the radiating fin having a rectangular cross-section with the same weight and the same height based on the simulation results described below. Furthermore, when the thickness ratio (X/x) is within the range of 1.0<X/x<5.4, a difference in thickness between the second portion and the first portion does not become too large, and thus the workability (ease of working) of the radiating fins can be ensured when the radiating fins are actually formed.

In the aforementioned heat exchanger for an aircraft engine according to the present invention, the radiating fins are preferably configured such that a ratio h/Y of a length h of the connecting portion, which is inclined, in a height direction of the radiating fins to the total height Y of each of the radiating fins from the surface of the core satisfies a relationship of 0<h/Y<0.64. Accordingly, in addition to the aforementioned findings, the inventors have found that when the ratio (h/Y) of a range of formation of the connecting portion to the total height of each of the radiating fins is within a range of 0<h/Y<0.64, the amount of heat exchange is improved. Thus, the improvement effect of the amount of heat exchange of at least 3% can be achieved as compared with the radiating fin having a rectangular cross-section with the same weight and the same height based on the simulation results described below.

In the aforementioned heat exchanger for an aircraft engine according to the present invention, each of the radiating fins preferably has a flat side surface on a first side, and an inclined side portion of the connecting portion on a side surface on a second side. Accordingly, the side surface of each of the radiating fins on the first side can be formed as a simple flat surface similar to that of the radiating fin having a general rectangular cross-section. Furthermore, on the side surface of each of the radiating fins on the second side, the first portion and the second portion can be different from each other in thickness due to the inclined side portion. In this configuration, skiving (working to form the radiating fins by cutting plate-shaped base materials) can be employed, for example, and thus it is possible to improve the easiness of working and ensure the degree of freedom in selecting a working method according to the shapes of the radiating fins.

In this case, the radiating fins are preferably configured such that a ratio h/Y of a length h of the connecting portion, which is inclined, in a height direction of the radiating fins to the total height Y of each of the radiating fins from the surface of the core satisfies a relationship of 0.20<h/Y<0.50. Accordingly, the high improvement effect of the amount of heat exchange of about 3.7% to about 3.8% in the vicinity of the peak can be achieved without an increase in the pressure loss as compared with the radiating fin having a rectangular cross-section with the same weight and the same height based on the simulation results described below.

In the aforementioned heat exchanger for an aircraft engine according to the present invention, each of the radiating fins preferably includes inclined side portions of the connecting portion on opposite side surfaces, respectively. Accordingly, the radiating fins each including the inclined side portions on the first side and the second side, respectively, can be obtained, and thus even when either side of each of the radiating fins faces the airflow that swirls in the aircraft engine, there is no great difference in heat exchange performance. Therefore, it is possible to significantly reduce or prevent the influence of the direction or the like of each of the radiating fins with respect to the direction of the airflow in the aircraft engine, unlike a case in which radiating fins each including an inclined side portion on only one side are provided, and thus the heat exchanger can be easily designed.

In this case, the radiating fins are preferably configured such that a ratio h/Y of a length h of the connecting portion, which is inclined, in a height direction of the radiating fins to the total height Y of each of the radiating fins from the surface of the core satisfies a relationship of 0<h/Y<0.40. Accordingly, the high improvement effect of the amount of heat exchange of about 3.5% can be achieved without an increase in the pressure loss as compared with the radiating fin having a rectangular cross-section with the same weight and the same height based on the simulation results described below.

In the aforementioned heat exchanger for an aircraft engine according to the present invention, each of the first portion and the second portion is preferably a flat plate-shaped portion having a substantially constant thickness. Accordingly, unlike a case in which at least one of the first portion and the second portion is a curved portion, the thickness of which changes, it is only necessary to form the first portion and the second portion into a flat plate shape, and thus the workability of the radiating fins is not impaired.

In the aforementioned heat exchanger for an aircraft engine according to the present invention, each of the radiating fins preferably has a shape in which the first portion and the second portion are connected to each other by the connecting portion, which is single. Accordingly, the shapes of the radiating fins can be simplified as compared with a case in which the radiating fins each having a sectional shape inclined in multiple steps by a plurality of connecting portions are formed. Consequently, even in the configuration in which the thicknesses of the radiating fins are changed, a reduction in the workability of the radiating fins can be significantly reduced or prevented as much as possible.

In the aforementioned heat exchanger for an aircraft engine according to the present invention, the core preferably has a curved shape along a curved surface in the aircraft engine, and has a hollow plate shape including a first surface that faces the curved surface and a second surface opposite to the first surface, and the plurality of radiating fins are preferably provided on at least one of the first surface and the second surface. Accordingly, in a surface cooler formed along the curved surface (such as the inner peripheral surface of a fan casing) in the aircraft engine, it is possible to meet the weight restrictions and the dimensional restrictions and improve the amount of heat exchange without an increase in the pressure loss.

Effect of the Invention

According to the present invention, as described above, it is possible to provide the heat exchanger for an aircraft engine capable of meeting the weight restrictions and the dimensional restrictions and improving the amount of heat exchange without an increase in the pressure loss.

BRIEF DESCRIPTION OF THE DRAWINGS

FIG. 5 Calculation results showing an improvement rate of the amount of heat exchange with respect to a ratio y/Y of the radiating fin according to the first embodiment.

FIG. 6 Calculation results showing a pressure loss ratio with respect to the ratio y/Y in FIG. 5.

FIG. 7 Calculation results showing an improvement rate of the amount of heat exchange with respect to a ratio X/x of the radiating fin according to the first embodiment.

FIG. 8 Calculation results showing a pressure loss ratio with respect to the ratio X/x in FIG. 7.

FIG. 9 Calculation results showing an improvement rate of the amount of heat exchange with respect to a ratio h/Y of the radiating fin according to the first embodiment.

FIG. 10 Calculation results showing a pressure loss ratio with respect to the ratio h/Y in FIG. 9.

FIG. 14 Calculation results showing an improvement rate of the amount of heat exchange with respect to a ratio y/Y of the radiating fin according to the second embodiment.

FIG. 15 Calculation results showing a pressure loss ratio with respect to the ratio y/Y in FIG. 14.

FIG. 18 Calculation results showing an improvement rate of the amount of heat exchange with respect to a ratio h/Y of the radiating fin according to the second embodiment.

FIG. 19 Calculation results showing a pressure loss ratio with respect to the ratio y/Y in FIG. 18.

FIG. 20 A diagram showing specific configuration examples (A) to (D) of the radiating fin according to the second embodiment.

MODES FOR CARRYING OUT THE INVENTION

Embodiments of the present invention are hereinafter described on the basis of the drawings.

The configuration of a heat exchanger 100 according to the present embodiments is described with reference to FIGS. 1 to 11. The heat exchanger 100 according to the present embodiments is a heat exchanger for an aircraft engine, and in particular, is an air-cooled heat exchanger (cooler) mounted in the aircraft engine and configured to exchange heat with an airflow in the aircraft engine. The aircraft engine is a type of engine, such as a gas turbine engine, which generates a propulsive force, utilizing air taken in a cylindrical casing from the outside, and a high-speed airflow is generated in the casing. A fluid to be cooled is a lubricating oil of an engine or a lubricating oil of a generator driven by the engine, for example.

(Overall Configuration of Heat Exchanger)

The overall configuration of the heat exchanger 100 is described with reference to FIGS. 1 to 3. In a configuration example of FIG. 1, the heat exchanger 100 is configured as a surface cooler. The surface cooler is a type of heat exchanger that cools the fluid to be cooled that flows through a plate-shaped core 1 with an airflow that flows along radiating fins 2 provided on a surface of the core 1. In this case, the heat exchanger 100 has a curved plate shape as a whole, and is arranged along a curved surface S (see FIG. 2) in the aircraft engine. The curved surface S in the aircraft engine is the inner peripheral surface of a fan casing of the engine, for example, but the heat exchanger 100 may be installed on any portion in the engine as long as the portion is exposed to the airflow.

The heat exchanger 100 is typically provided along the substantially cylindrical curved surface S with a length of about 1/n round (n is a natural number) in a circumferential direction (C direction). For example, the heat exchanger 100 has a length of about ⅛ round, but the heat exchanger 100 may have an annular shape that extends over substantially the entire circumference of the curved surface S in the aircraft engine. The airflow flows along an A direction (see FIG. 1), which is a substantially axial direction (the rotational axis direction of a turbine) in the aircraft engine. The curved surface S in the aircraft engine is not necessarily a perfect cylindrical curved surface, and thus the radius of curvature of the heat exchanger 100 in that case varies depending on a position in the axial direction (A direction).

Figure 1:
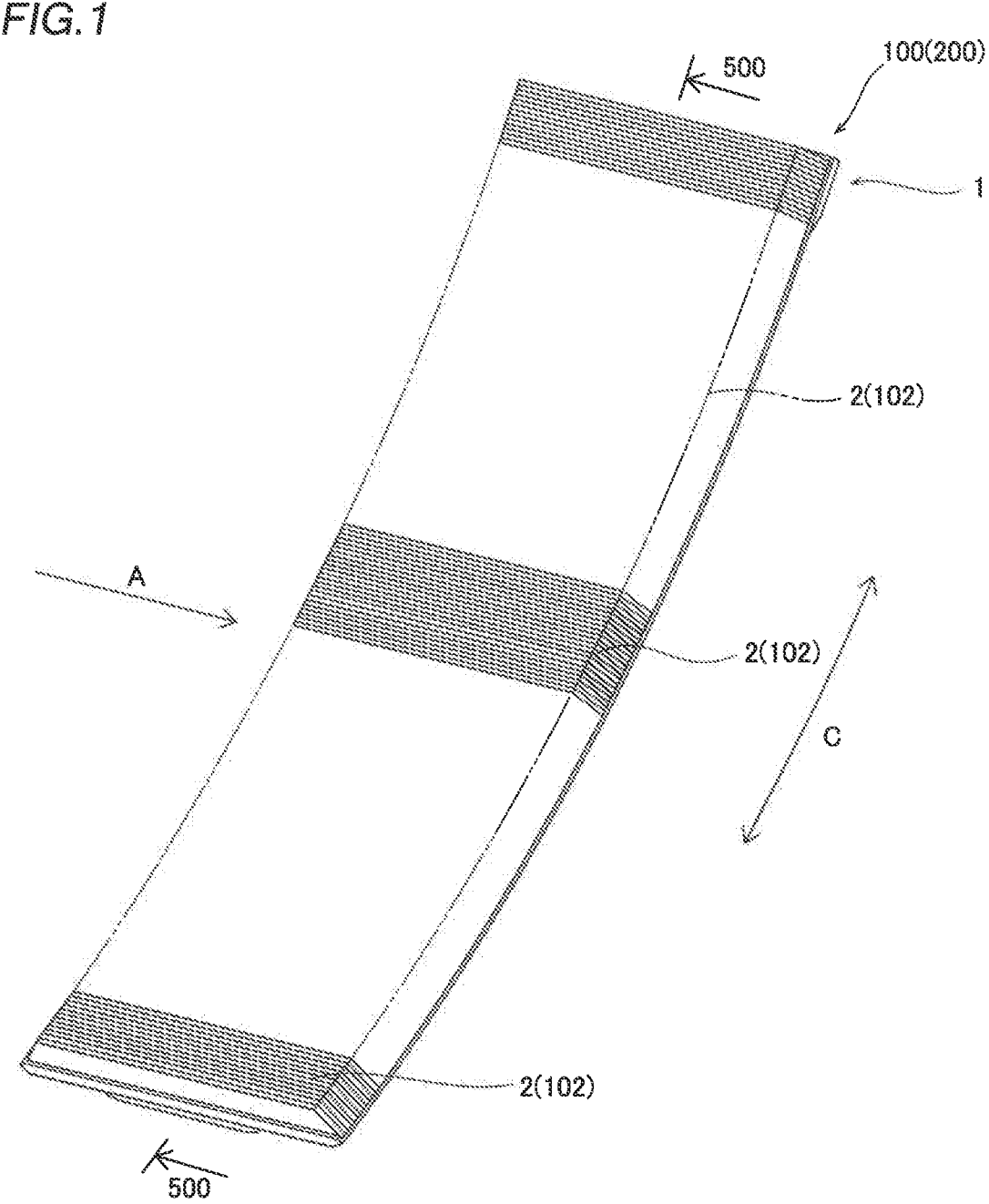
FIG. 1 A perspective view schematically showing a heat exchanger according to first and second embodiments.
Figure 2:
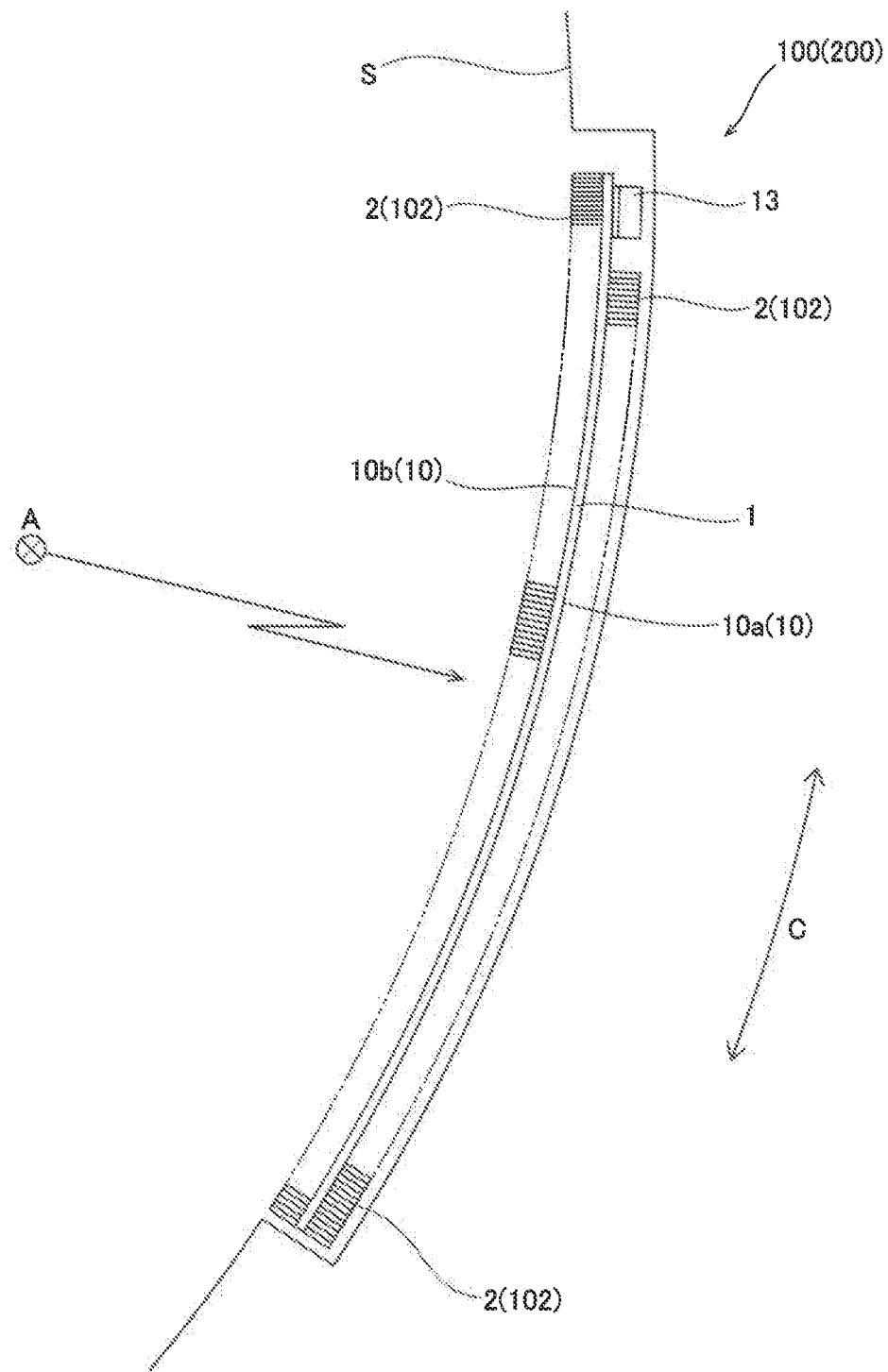
FIG. 2 A schematic sectional view of the heat exchanger taken along the line 500-500 in FIG. 1.

As shown in FIGS. 1 and 2, the heat exchanger 100 includes the core 1 configured to allow the fluid to be cooled to flow therethrough, and a plurality of plate-shaped radiating fins 2 provided on surfaces 10 (see FIG. 2) of the core 1.

The core 1 has a curved shape along the curved surface S in the aircraft engine. The core 1 has a hollow plate shape including a first surface 10a that faces the curved surface S and a second surface 10b opposite to the first surface 10a. A flow path 3 (see FIG. 3) is formed inside the core 1. As shown in FIG. 3, the core 1 is configured by stacking a first member 11 on the first surface 10a side and a second member 12 on the second surface 10b side in a thickness direction. On the inner surface of the second member 12, the flow path 3 including a recess is formed, and corrugated fins 31 are arranged in the flow path 3. The open surface side of the flow path 3 is covered with the first member 11 such that the flow path 3 through which the fluid to be cooled flows is formed inside the core 1.

The flow path 3 has a turned-back shape including a forward path 3a and a return path 3b. The forward path 3a and the return path 3b are partitioned by a peripheral wall 12a and a partition 12b formed on the second member 12. The forward path 3a extends from a first end of the core 1 to a second end in a longitudinal direction (C direction), and the return path 3b extends from the second end of the core 1 to the first end in the longitudinal direction. The forward path 3a and the return path 3b communicate with each other on the second end side of the core 1. A header 13 including an inflow port 13a and an outflow port 13b is provided at a first end of the first member 11 in the longitudinal direction. The inflow port 13a connects the forward path 3a to the outside on the first end side of the core 1. The outflow port 13b connects the return path 3b to the outside on the first end side of the core 1. Each of the inflow port 13a and the outflow port 13b is connected to a flow path (not shown) for the fluid to be cooled.

The corrugated fins 31 are plate-shaped fins having a wave shape in a direction (flow path width direction) orthogonal to a direction in which the flow path 3 (the forward path 3a and the return path 3b) extends. The corrugated fins 31 are joined to the first member 11 and the second member 12 on opposite sides in the thickness direction, and partition the flow path 3 into a plurality of fine flow paths.

The plurality of radiating fins 2 are formed on at least one of the first surface 10a and the second surface 10b. In configuration examples of FIGS. 1 to 3, the plurality of radiating fins 2 are provided on both the first surface 10a and the second surface 10b. The plurality of radiating fins 2 may be provided on only one of the first surface 10a and the second surface 10b. Each radiating fin 2 has a plate shape. Each radiating fin 2 is provided upright in a direction substantially perpendicular to each surface 10. The plurality of radiating fins 2 are provided in parallel to each other at substantially equal intervals (substantially equal pitches). In FIG. 1, the plurality of radiating fins 2 extend along the short-side direction (A direction) of the core 1. That is, the plurality of radiating fins 2 extend along the axial direction (A direction) in the aircraft engine. The plurality of radiating fins 2 may be inclined with respect to the axial direction (A direction). Furthermore, the plurality of radiating fins 2 do not need to be parallel to each other, and the intervals between the fins do not need to be constant. The structure of each radiating fin 2 is described below.

The core 1 is made of aluminum, an aluminum alloy, stainless steel, titanium, copper, or Inconel (registered trademark), for example. Materials for the radiating fins 2 are the same as that of the core 1. The radiating fins 2 are formed integrally with each of the first member 11 and the second member 12 by working (such as cutting) on plate materials for the first member 11 and the second member 12, for example. The core 1 is formed by assembling the first member 11, the second member 12, and the corrugated fins 31 and joining the same to each other by brazing, for example. Note that the plurality of radiating fins 2 may be formed separately from the first member 11 and the second member 12, and attached to each of the first member 11 and the second member 12, for example.

Figure 3:
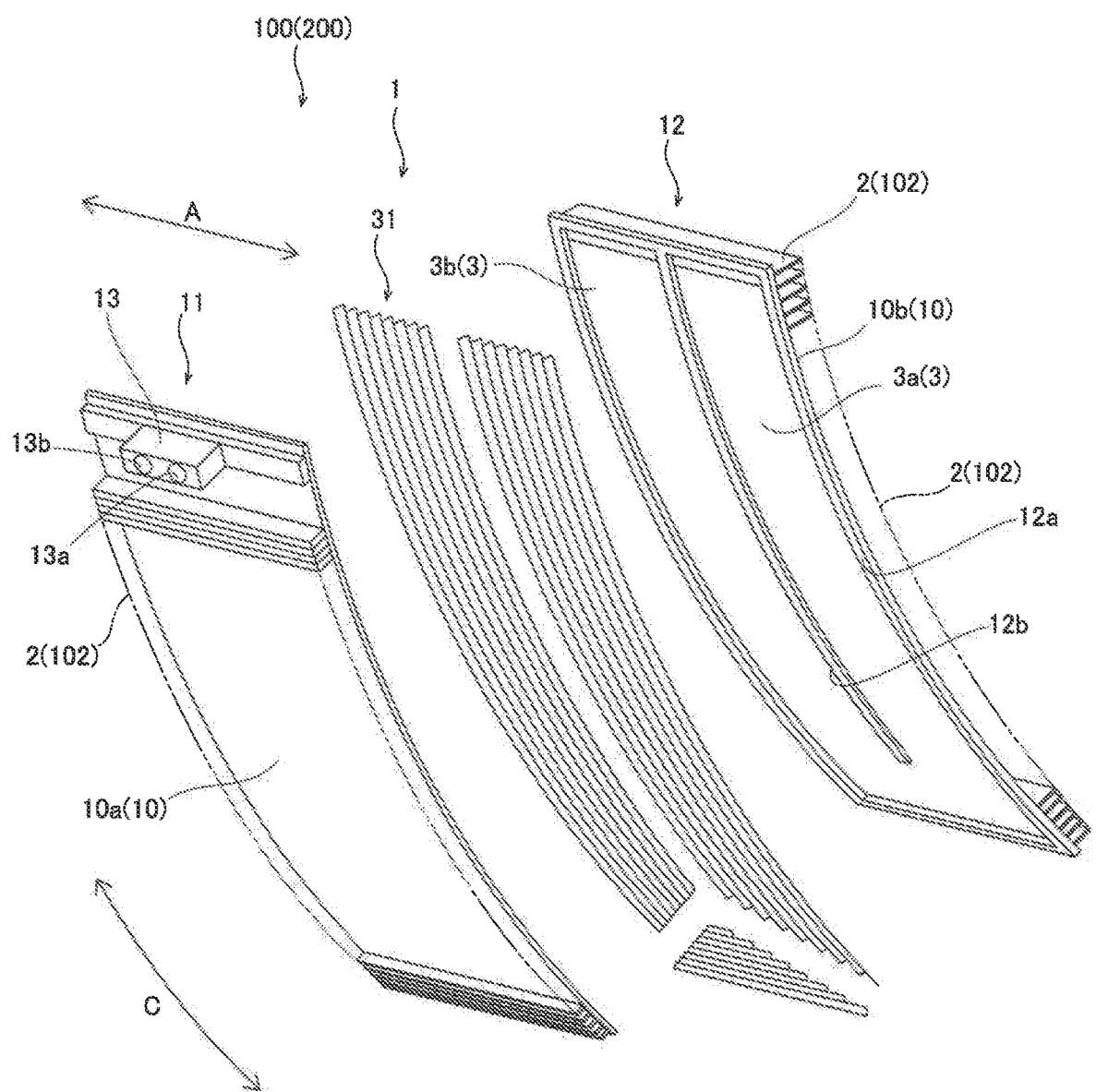
FIG. 3 A schematic exploded perspective view for illustrating the structure of the heat exchanger.

As shown in FIG. 3, the fluid to be cooled flows from the inflow port 13a of the header 13 into the flow path 3 inside the core 1. The fluid to be cooled is distributed to the fine flow paths partitioned by the corrugated fins 31 in the flow path 3, and flows through the forward path 3a and the return path 3b in this order. On the other hand, outside the core 1, a high-speed airflow passes along each radiating fin 2 on the surfaces 10 of the core 1 as the aircraft engine operates. Consequently, heat exchange is performed between the fluid to be cooled that flows through the core 1 (through the flow path 3) and an external airflow via the core 1 and each radiating fin 2. That is, the heat of the high-temperature fluid to be cooled is transferred to each radiating fin 2 via the corrugated fins 31, the first member 11, and the second member 12, and is radiated from each radiating fin 2 to the external airflow. The fluid to be cooled that has been cooled flows out of the heat exchanger 100 via the outflow port 13b of the header 13, and is returned to a device (such as an engine or a generator) in which the fluid to be cooled is used.

First Embodiment (Radiating Fins)

Figure 4:
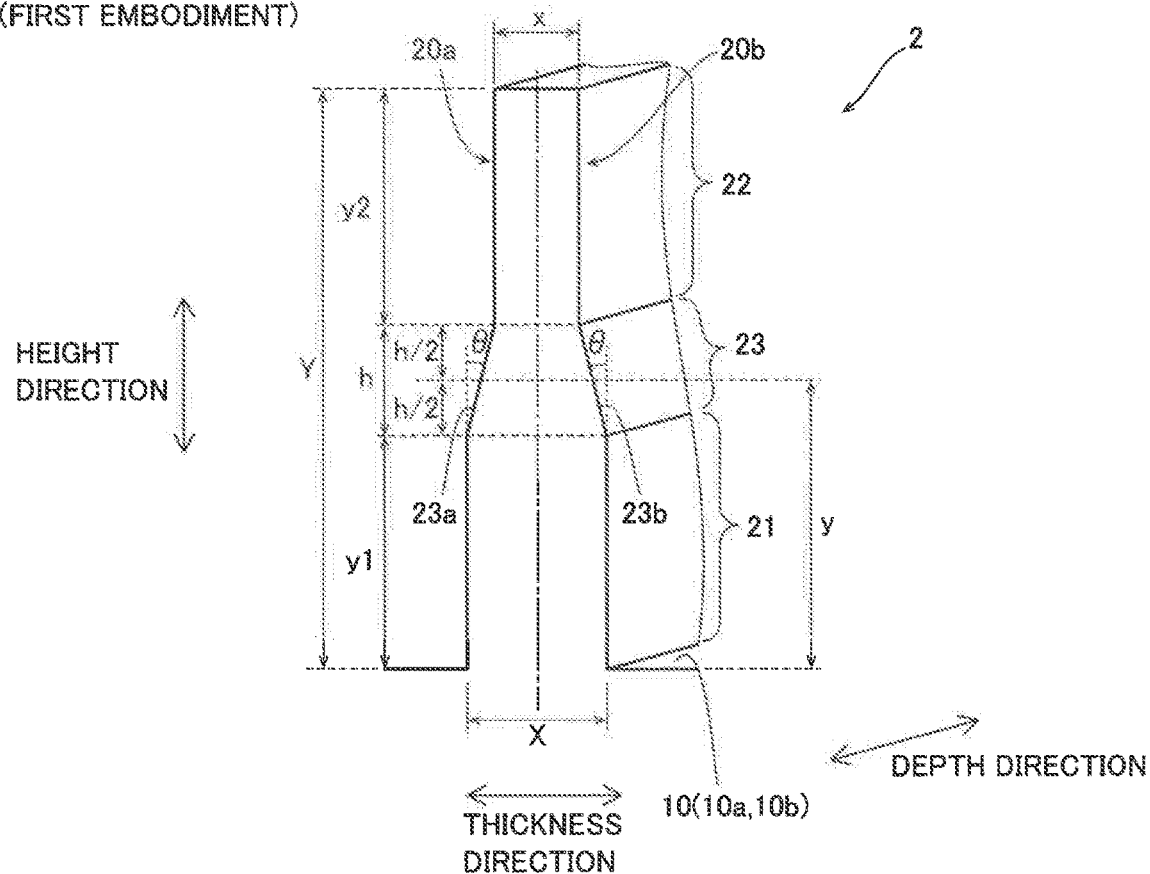
FIG. 4 A diagram for illustrating the shape of a radiating fin of the heat exchanger according to the first embodiment.

The shapes of the radiating fins 2 of the heat exchanger 100 according to a first embodiment are now described. An individual radiating fin 2 of the heat exchanger 100 shown in FIGS. 1 to 3 has a shape shown in detail in FIG. 4. FIG. 4 shows the shape of the radiating fin 2 in a cross-section orthogonal to a direction (A direction) in which the radiating fin 2 extends. The lower side of FIG. 4 is the surface 10 side of the core 1. A direction in which the radiating fin 2 protrudes from the surface 10 of the core 1 (a direction orthogonal to the surface 10) is hereinafter referred to as the height direction of the radiating fin 2. A right-left direction of FIG. 4 is the thickness direction of the radiating fin 2, and a depth direction orthogonal to the height direction and the thickness direction corresponds to the A direction. In FIGS. 1 to 3, each radiating fin 2 is illustrated as a simple flat plate shape in a simplified manner for convenience.

As shown in FIG. 4, the radiating fin 2 includes a first portion 21, a second portion 22, and a connecting portion 23. The first portion 21 is a base side portion that rises from the surface 10 of the core 1. The second portion 22 is a portion of the radiating fin 2 arranged on the tip side relative to the first portion 21. The second portion 22 has a thickness smaller than that of the first portion 21. The connecting portion 23 is an inclined portion that connects the first portion 21 to the second portion 22. In other words, the connecting portion 23 is a portion, the thickness of which varies between the first portion 21 and the second portion 22 having different thicknesses. The connecting portion 23 is a portion inclined with respect to the first portion 21 and the second portion 22. The first portion 21, the second portion 22 and the connecting portion 23 are integrally formed.

The radiating fin 2 has a total height Y (a dimension in the height direction) from the surface 10 of the core 1. The total height Y is set within a range of about 10 mm to 50 mm, for example, and is limited to a predetermined value or less according to dimensional restrictions in the aircraft engine.

Each of the first portion 21 and the second portion 22 extends along the height direction of the radiating fin 2. Each of the first portion 21 and the second portion 22 is linear on opposite side portions in the thickness direction. In the first embodiment, each of the first portion 21 and the second portion 22 is a flat plate-shaped portion having a substantially constant thickness (a dimension in the thickness direction). That is, the first portion 21 is a flat plate-shaped portion having a thickness X and a length y1 in the height direction and extending in the depth direction with the same sectional shape. The first portion 21 is connected to the surface 10 of the core 1 at the lower end thereof. The second portion 22 is a flat plate-shaped portion having a thickness x and a length y2 in the height direction and extending in the depth direction with the same sectional shape. The upper end of the second portion 22 is the tip of the radiating fin 2. As described above, a relationship of thickness x<thickness X is satisfied. The thickness X of the first portion 21 is equal to the maximum thickness of the radiating fin 2.

The connecting portion 23 is connected to the first portion 21 at the lower end thereof and is connected to the second portion 22 at the upper end thereof. The connecting portion 23 has a height h in the height direction. The connecting portion 23 is formed at a height y. The height of the formation position of the connecting portion 23 is defined as a distance from the surface 10 to the position of the center (h/2) of the connecting portion 23.

The connecting portion 23 includes a pair of side portions 23a and 23b on opposite sides in the thickness direction. The connecting portion 23 includes at least one inclined side portion. That is, the side portions 23a and 23b have inclined surfaces on the opposite sides as shown in FIG. 4, or have an inclined surface on one side (see FIG. 13). In the present specification, that the connecting portion 23 or the side portions 23a and 23b are inclined indicates that the same are inclined with respect to the first portion 21 and the second portion 22. Furthermore, the connecting portion 23 is inclined with respect to the height direction of the radiating fin 2. The shape of each of the inclined side portions does not include a shape in which the side portion is parallel to the height direction of the radiating fin 2 and a shape in which the side portion is perpendicular to the height direction of the radiating fin 2 (parallel to the thickness direction).

The thickness of the connecting portion 23 varies between the thickness X of the first portion 21 and the thickness x of the second portion 22 due to the inclined side portions 23*a* and 23*b*. In an example of FIG. 4, the maximum thickness of the connecting portion 23 is equal to the thickness X, and the minimum thickness of the connecting portion 23 is equal to the thickness x. The side portions 23*a* and 23*b* are inclined such that the thickness of the connecting portion 23 decreases toward the second portion 22. The side portions 23*a* and 23*b* are formed as linear inclined surfaces. That is, the inclination angles θ of the side portions 23*a* and 23*b* are substantially constant over the entire connecting portion 23. The term "substantially constant" denotes that changes or variations in the inclination angles of the upper end and the lower end due to the working restrictions, the dimensional errors, etc. of the radiating fin 2 are allowed. In the example of FIG. 4, the inclination angles θ of the side portions 23*a* and 23*b* are substantially the same.

The radiating fin 2 has a shape in which one first portion 21 and one second portion 22 are connected to each other by one connecting portion 23. That is, the radiating fin 2 includes three portions including one first portion 21, one second portion 22, and one connecting portion 23. The radiating fin 2 has a shape with a reduced thickness at an intermediate position (connecting portion 23) in the height direction.

In the first embodiment, the radiating fin 2 includes the inclined side portions 23*a* and 23*b* of the connecting portion 23 on opposite side surfaces 20*a* and 20*b*, respectively. In the example of FIG. 4, the inclined side portions 23*a* and 23*b* are formed on both the side surface 20*a* on the left side (first side) in the figure and the side surface 20*b* on the right side (second side) in the figure, respectively.

The radiating fin 2 has a bilaterally symmetrical shape. The centers of the first portion 21, the second portion 22, and the connecting portion 23 coincide with each other in the thickness direction. The side surface 20*a* of the radiating fin 2 on the first side and the side surface 20*b* thereof on the second side have a symmetrical shape with the center in the thickness direction interposed therebetween.

(Dimensional Relationship of Radiating Fin)

The relationship of the dimensions of each portion of the radiating fin 2 is now described. In the first embodiment, in the radiating fin 2, the height y of the formation position of the connecting portion 23, the thickness X of the first portion 21, the thickness x of the second portion 22, the length h of the connecting portion 23, etc. satisfy a predetermined relationship.

FIGS. 5 to 10 show the calculation results of a simulation based on computational fluid dynamics in which the improvement rate (increase rate) of the amount of heat exchange is calculated with each dimension of the radiating fin 2 as a variable parameter. A predetermined relationship to be satisfied by the shape of the radiating fin 2 according to the first embodiment has been derived based on the calculation results of this simulation. The shape of the radiating fin 2 is described below, together with the calculation results.

In the simulation, the airflow was a three-dimensional steady, compressible flow, and calculation was performed using the k-E turbulence model. As the simulation conditions, the flow rate on the air side was 100 [m/s], the temperature was 40 [° C.], the atmospheric pressure was 1 atm, and the temperature on the high-temperature side (the surface 10 of the core 1) was 150 [° C.]. Assuming that the radiating fin 2 was made of aluminum, the density (2702.0 [kg/m$^3$]) and the thermal conductivity (237.0 [W/(m·K)]) were set.

Figure 11:
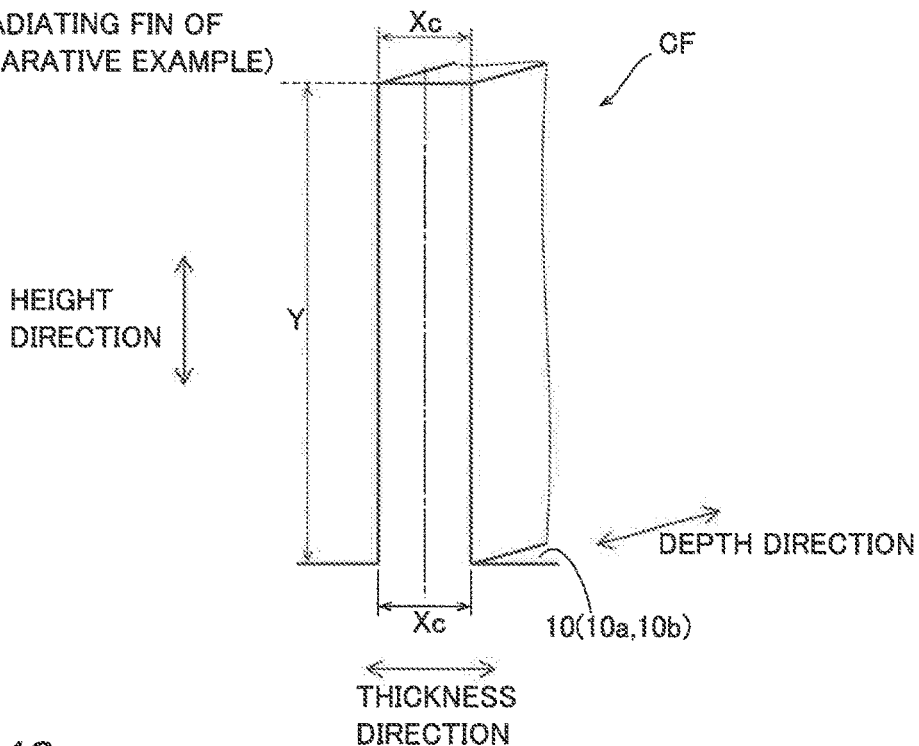
FIG. 11 A diagram for illustrating the shape of a radiating fin according to a comparative example.

In the simulation, in order to use a comparative example shown in FIG. 11 as an index of the improvement rate of the amount of heat exchange, the comparative example shown in FIG. 11 was used as a reference (improvement rate=1). The comparative example is a flat plate-shaped radiating fin CF having a rectangular cross-section formed such that the base side and the tip side have the same thickness Xc.

Calculation was performed on three patterns of Y=10 [mm], 20 [mm], and 30 [mm] (excluding FIGS. 9 and 10) as the total heights Y of the radiating fins CF and 2 of the comparative example and the first embodiment. In the radiating fins CF and 2 of the comparative example and the first embodiment, the lengths in the depth direction (flow direction) were 150 [mm], and the sectional shapes were constant over the entire lengths in the depth direction (see FIGS. 4 and 11). The thickness Xc of the radiating fin CF of the comparative example was set such that the weights of the radiating fin CF and the radiating fin 2 of the first embodiment were the same. It is assumed that the radiating fin 2 and the radiating fin CF have the same lengths in the depth direction with the constant sectional shapes, and thus the term "same weights" indicate the same sectional areas.

The calculation was performed for three features including the height y of the formation position of the connecting portion 23 (Feature 1), the thickness x of the second portion 22 (Feature 2), and the length h of the connecting portion 23 in the height direction (i.e., a range of formation of the connecting portion 23) (Feature 3).

(Feature 1) The height y (see FIG. 4) of the formation position of the connecting portion 23 can be generalized as a ratio y/Y of the height y from the surface 10 of the core 1 to the formation position of the connecting portion 23 to the total height Y of the radiating fins 2 from the surface 10 of the core 1. As the ratio y/Y decreases, the connecting portion 23 is arranged closer to the base of the radiating fin 2, and as the ratio y/Y increases, the connecting portion 23 is arranged closer to the tip of the radiating fin 2. When y/Y=0 (y=0), the first portion 21 is not formed, and when y/Y= (y=Y), the second portion 22 is not formed. Therefore, the range of the ratio y/Y that can be derived by calculation is 0<y/Y<1.

(Feature 2) The thickness x of the second portion 22 can be generalized as a ratio X/x of the thickness X of the first portion 21 to the thickness x of the second portion 22. When the value of the ratio X/x is 1, the rectangular cross-section is the same as that of the comparative example, and when the value of the ratio X/x is greater than 1, the second portion 22 on the tip side has a narrowed shape. As the ratio X/x decreases, narrowing (a difference in thickness between the second portion 22 and the first portion 21) of the radiating fin 2 on the tip side is reduced, and as the ratio X/x increases, narrowing of the radiating fin 2 on the tip side is increased, and the second portion 22 becomes relatively thin. In the first embodiment, because x<X, the range of the ratio X/x that can be derived by calculation is 1<X/x.

(Feature 3) The length h of the connecting portion 23 in the height direction can be generalized as a ratio h/Y of the length h of the connecting portion 23 of the radiating fin 2 in the height direction to the total height Y of the radiating fin 2 from the surface 10 of the core 1. As the value of the ratio h/Y decreases, the inclination angle θ of the connecting portion 23 increases, and the connecting portion 23 approaches a step shape with a right angle. As the value of the ratio h/Y increases, the inclination angle θ of the connecting portion 23 decreases, and the radiating fin 2 approaches a flat plate shape. In the first embodiment, the connecting portion 23 is inclined, and thus h/Y>0. When h/Y=1, the first portion 21 and the second portion 22 are not formed, and thus the range of the ratio h/Y that can be derived by calculation is 0<h/Y<1.

The calculation was performed for each feature, using one of the ratio y/Y of (Feature 1), the ratio X/x of (Feature 2), and the ratio h/Y of (Feature 3) as a variable parameter, and the remaining parameters as fixed parameters.

<Formation Position of Connecting Portion>

The ratio y/Y (Feature 1) of the height y of the formation position of the connecting portion 23 to the total height Y is now described. FIG. 5 shows a change in the improvement rate of the amount of heat exchange with respect to the comparative example (improvement rate=1) in a case in which the ratio y/Y is changed, and FIG. 6 shows a change in a pressure loss ratio with respect to the comparative example (ratio=1) in a case in which the ratio y/Y is changed. In each figure, a plurality of calculation results are plotted to obtain an approximate curve. In FIGS. 5 and 6, the ratio y/Y is set as a variable parameter, and the ratio X/x=2.2 and the ratio h/Y=0 are set as fixed parameters. The ratio h/Y=0 represents a case in which the connecting portion 23 has a step shape with a right angle (inclination angle θ=90 degrees), and is set for convenience of evaluation of the variable parameter.

Based on the calculation results of FIGS. 5 and 6, in the first embodiment, the radiating fin 2 is configured such that the ratio y/Y of the height y from the surface 10 of the core 1 to the formation position of the connecting portion 23 to the total height Y of the radiating fins 2 from the surface 10 of the core 1 satisfies a relationship of 0.34<y/Y<0.64.

Specifically, in FIG. 5, as a tendency common to all of the total heights Y, the improvement rate is maximized near the ratio y/Y=0.5, and is about 3.5% to about 4.8%. The improvement rate gradually decreases from the ratio y/Y=0.5 toward opposite sides. Within a range of 0.34<y/Y<0.64, an improvement rate of about 2% (about 1.8%) or more is obtained. In FIG. 6, it can be seen that when the ratio y/Y=0.34, a pressure loss exceeds that of the comparative example (=1.00) at Y=20 mm, but the pressure loss drops sharply within a range of 0.34<y/Y and falls below that of the comparative example. At Y=10 mm and 30 mm, the pressure loss is consistently below that of the comparative example. Therefore, the ratio y/Y is set to 0.34<y/Y<0.64 such that the improvement rate of about 2% or more can be expected without the pressure loss exceeding that of the comparative example.

The height y to the formation position of the connecting portion 23 is based on the center (h/2) of the connecting portion 23 in the height direction, and thus when the ratio y/Y is a value in the vicinity of the upper limit or the lower limit of the above range, for example, the lower end of the connecting portion 23 may be arranged below a position of 34% of the total height Y, or the upper end of the connecting portion 23 may be arranged above a position of 64% of the total height Y.

Preferably, the ratio y/Y satisfies a relationship of 0.42<y/Y<0.64. In this case, at any total height Y, the pressure loss is lower than that of the comparative example, and the amount of heat exchange can be expected to be improved by about 3% or more as compared with the comparative example. More preferably, the ratio y/Y satisfies a relationship of 0.45<y/Y<0.59. In this case, the improvement rate in the vicinity of the peak can be achieved for the amount of heat exchange at any total height Y. In particular, when Y=20 mm and Y=30 mm, an improvement rate of 4% or more can be expected.

<Thickness of Second Portion>

The ratio X/x (Feature 2) of the thickness X of the first portion 21 to the thickness x of the second portion 22 is now described. FIGS. 7 and 8 show the improvement rate (FIG. 7) of the amount of heat exchange and the ratio (FIG. 8) of the pressure loss with respect to the comparative example in a case in which the ratio X/x is set as a variable parameter, and the ratio y/Y=0.5 and the ratio h/Y=0 are set as fixed parameters. In FIGS. 7 and 8, the comparative example (see FIG. 11) corresponds to the ratio X/x=1.

Based on the calculation results of FIGS. 7 and 8, the radiating fin 2 is preferably configured such that the ratio X/x of the thickness X of the first portion 21 to the thickness x of the second portion 22 satisfies a relationship of 1.0<X/x<5.4.

In FIG. 7, as a tendency common to all of the total heights Y, the improvement rate is maximized (about 3.5% to about 4.8%) near the ratio X/x=2.2. The improvement rate tends to decrease from the ratio X/x=2.2 toward opposite sides. The improvement rate is 0% at the ratio X/x=1, and the improvement rate exceeds that of the comparative example within a range of 1.0<X/x<5.4. In a pressure loss ratio of FIG. 8, the pressure loss monotonically decreases as the ratio X/x increases from X/x=1.0. Therefore, when the ratio X/x is set within the range of 1.0<X/x<5.4, the amount of heat exchange can be expected to be improved without an increase in the pressure loss as compared with the comparative example.

As the heat exchanger 100 for an aircraft engine, the maximum thickness X of the radiating fin 2 is generally less than 3 mm, and may be less than 2 mm or even around 1 mm. Therefore, when the ratio X/x exceeds 5.4, the thickness x of the second portion 22 becomes too small, and the workability (ease of working) may be reduced. Therefore, when the ratio X/x is set to 1.0<X/x<5.4, it is possible to ensure the workability while improving the amount of heat exchange as compared with the comparative example.

Preferably, the ratio X/x satisfies a relationship of 1.5<X/x<4.5. It can be seen that, within a range of 1.5<X/x<4.5, the improvement rate is about 2% or more at any total height Y. The pressure loss is also lower than that of the comparative example. Therefore, the ratio X/x is set to 1.5<X/x<4.5 such that the amount of heat exchange can be expected to be improved by about 2% or more without an increase in the pressure loss as compared with the comparative example.

More preferably, the ratio X/x satisfies a relationship of 2.0<X/x<4.2. In this case, even when attention is focused on Y=10 mm, which has the smallest improvement rate, an improvement rate of about 3% or more can be expected as compared with the comparative example. Therefore, the ratio X/x is set to 2.0<X/x<4.2 such that the amount of heat exchange can be expected to be improved by about 3% or more without an increase in the pressure loss as compared with the comparative example.

<Length of Connecting Portion>

The ratio h/Y (Feature 3) of the length h of the connecting portion 23 to the total height Y of the radiating fin 2 is now described. FIGS. 9 and 10 show the improvement rate (FIG. 9) of the amount of heat exchange and a pressure loss ratio (FIG. 10) with respect to the comparative example in a case in which the ratio h/Y is set as a variable parameter, and the ratio y/Y=0.5 and the ratio X/x=2.2 are set as fixed parameters. For this calculation, the total height Y of the radiating fin 2 is set to Y=20 mm.

In the first embodiment, based on the calculation results of FIGS. 9 and 10, the radiating fin 2 is preferably configured such that the ratio h/Y of the length h of the connecting portion 23 of the radiating fin 2 in the height direction to the total height Y of the radiating fin 2 from the surface 10 of the core 1 satisfies a relationship of 0<h/Y<0.64.

In FIG. 9, the improvement rate is a substantially constant value (about 3.5%) in the vicinity of the maximum value within a range of around 0<h/Y<0.50. Although the slope is gentle, the improvement rate monotonically decreases as the ratio h/Y increases from 0.4. Even at the ratio h/Y=0.64, the improvement rate exceeds 3%. In FIG. 10, the pressure loss monotonically increases as the ratio h/Y increases from 0, but in any case, the pressure loss is lower than that of the comparative example (=1.00). Therefore, the ratio h/Y is set within a range of 0<h/Y<0.64 such that the amount of heat exchange can be expected to be improved by about 3% or more without an increase in the pressure loss as compared with the comparative example.

Preferably, the ratio h/Y satisfies a relationship of 0<h/Y<0.40. In this case, an improvement rate of about 3.5% in the vicinity of the maximum value can be expected with respect to the comparative example. More preferably, the ratio h/Y satisfies a relationship of 0<h/Y<0.20. In FIG. 10, within a range of 0<h/Y<0.20, the increasing tendency of the pressure loss is gradual, and the pressure loss can be considered to be substantially constant. When the ratio h/Y exceeds 0.20, the slope of the pressure loss increases with an increase in the ratio h/Y. Therefore, the ratio h/Y is set within the range of 0<h/Y<0.20 such that an improvement rate of about 3.5% or more can be expected with respect to the comparative example, and the pressure loss can be effectively reduced.

<About Calculation Results>

When the dimensions in an airflow direction (the depth direction and the A direction) are the same, the weight of the radiating fin 2 is determined by the sectional area. The above calculation is performed under the conditions in which the height and the sectional area are the same as those of the comparative example in FIG. 11, and thus the height dimension and the weight of the radiating fin 2 according to the first embodiment are not changed as compared with the comparative example. Therefore, it can be seen from the calculation results of FIGS. 5 to 10 that the radiating fin 2 according to the first embodiment can improve the amount of heat exchange while meeting weight restrictions and dimensional restrictions. Furthermore, it can be seen from the calculation results of the pressure loss in FIGS. 6, 8, and 10 that the pressure loss can be reduced.

<Configuration Example of Radiating Fin>

Figure 12:
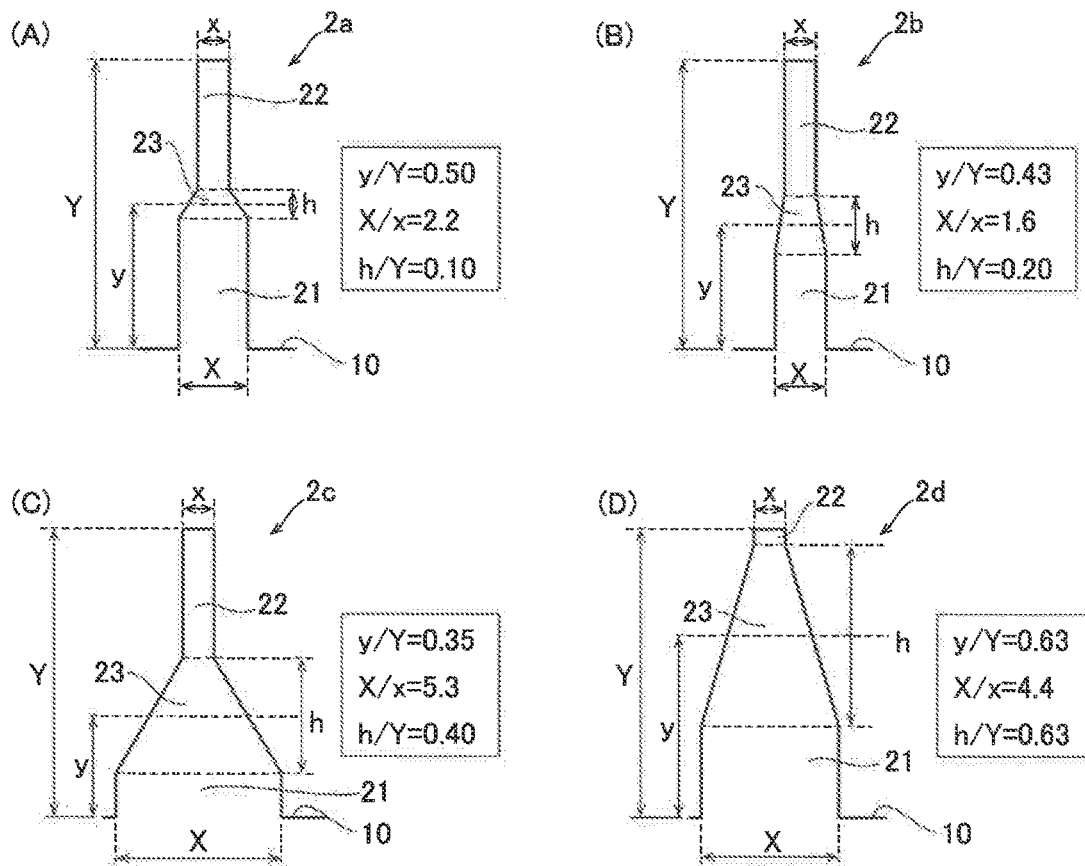
FIG. 12 A diagram showing specific configuration examples (A) to (D) of the radiating fin according to the first embodiment.

FIGS. 12(A) to 12(D) show specific examples of the shape of the radiating fin 2 within each parameter range obtained from the above calculation results. A radiating fin 2a of FIG. 12(A) is configured so as to satisfy a relationship of the ratio y/Y=0.50, the ratio X/x=2.2, and the ratio h/Y=0.10. A radiating fin 2b in FIG. 12(B) is configured so as to satisfy a relationship of the ratio y/Y=0.43, the ratio X/x=1.6, and the ratio h/Y=0.20. A radiating fin 2c of FIG. 12(C) is configured so as to satisfy a relationship of the ratio y/Y=0.35, the ratio X/x=5.3, and the ratio h/Y=0.40. A radiating fin 2d in FIG. 12(D) is configured so as to satisfy a relationship of the ratio y/Y=0.63, the ratio X/x=4.4, and the ratio h/Y=0.63. Thus, the radiating fin 2 in the heat exchanger 100 according to the first embodiment may include various modified examples within the above parameter ranges for the parameters of the ratio y/Y, the ratio X/x, and the ratio h/Y.

Advantageous Effects of First Embodiment

According to the first embodiment, the following advantageous effects are achieved.

According to the first embodiment, based on the above simulation results (see FIGS. 5 and 6), the radiating fin 2 is configured such that the ratio y/Y satisfies the relationship of 0.34<y/Y<0.64. Accordingly, the improvement effect of the amount of heat exchange of about 2% or more (about 1.8% or more) can be achieved as compared with the radiating fin CF (see FIG. 11) having a rectangular cross-section with the same weight and the same height. Consequently, it is possible to meet the weight restrictions and the dimensional restrictions and improve (increase) the amount of heat exchange without an increase in the pressure loss.

When the radiating fin 2 is configured such that the ratio X/x satisfies the relationship of 1.0<X/x<5.4 based on the above simulation results (see FIGS. 7 and 8), it is possible to improve the amount of heat exchange without an increase in the pressure loss as compared with the radiating fin CF (see FIG. 11) having a rectangular cross-section with the same weight and the same height. Furthermore, when the thickness ratio (X/x) is within the range of 1.0<X/x<5.4, the difference in thickness between the second portion 22 and the first portion 21 does not become too large (or too small), and thus the workability (ease of working) of the radiating fin 2 can be ensured when the radiating fin 2 is actually formed.

When the radiating fin 2 is configured such that the ratio h/Y satisfies the relationship of 0<h/Y<0.64 based on the above simulation results (see FIGS. 9 and 10), the improvement effect of the amount of heat exchange of at least 3% can be achieved as compared with the radiating fin CF (see FIG. 11) having a rectangular cross-section with the same weight and the same height.

Furthermore, the first portion 21 and the second portion 22 are flat plate-shaped portions each having a substantially constant thickness, and thus unlike a case in which at least one of the first portion 21 and the second portion 22 is a curved portion, the thickness of which changes, it is only necessary to form the first portion 21 and the second portion 22 into a flat plate shape, and thus the workability of the radiating fin 2 is not impaired.

Moreover, the radiating fin 2 has a shape in which the first portion 21 and the second portion 22 are connected to each other by one connecting portion 23, and thus the shape of the radiating fin 2 can be simplified as compared with a case in which a radiating fin having a sectional shape inclined in multiple steps by a plurality of connecting portions 23 is formed. Consequently, even in the configuration in which the thickness of the radiating fin 2 is changed, a reduction in the workability of the radiating fin 2 can be significantly reduced or prevented as much as possible.

In addition, a plurality of radiating fins 2 are formed on at least one of the first surface 10a and the second surface 10b of the core 1 having a curved shape along the curved surface S, and thus in the surface cooler formed along the curved surface S in the aircraft engine, it is possible to meet the weight restrictions and the dimensional restrictions and improve the amount of heat exchange without an increase in the pressure loss.

Moreover, the inclined side portions 23a and 23b of the connecting portion 23 are provided on the opposite side surfaces 20a and 20b of the radiating fin 2, respectively, and thus the radiating fin 2 including the inclined side portions 23a and 23b on the first side and the second side, respectively, can be obtained, and thus even when either side of the radiating fin faces the airflow that swirls in the aircraft engine, there is no great difference in heat exchange performance. That is, although the airflow in the aircraft engine is mainly directed in the A direction, a flow that swirls along the inner peripheral surface of the fan casing occurs. Thus, when the shapes of the opposite side surfaces 20a and 20b are greatly different, it is necessary to consider which side of the radiating fin faces the swirling direction of the airflow. Therefore, in the first embodiment, it is possible to significantly reduce or prevent the influence of the direction or the like of the radiating fin 2 with respect to the direction of the airflow in the aircraft engine, and thus the heat exchanger can be easily designed. In particular, when the inclination angles θ of the side portions 23a and 23b are matched, and the radiating fin 2 is bilaterally symmetrical, the same heat exchange performance can be obtained regardless of which side surface 20a or 20b faces the direction of the airflow.

When the radiating fin 2 is configured such that the ratio h/Y satisfies the relationship of 0<h/Y<0.40 based on the above simulation results (see FIGS. 9 and 10), the high improvement effect of the amount of heat exchange of about 3.5% can be achieved without an increase in the pressure loss as compared with the radiating fin CF (see FIG. 11) having a rectangular cross-section with the same weight and the same height.

Second Embodiment

A second embodiment is now described with reference to FIGS. 13 to 20. In the second embodiment, an example is described in which in a heat exchanger 200 (see FIGS. 1 to 3), a side surface 120a of a radiating fin 102 on a first side is a flat surface, and an inclined side portion 123b of a connecting portion 123 is formed on a side surface 120b of the radiating fin 102 on a second side, unlike the first embodiment in which the inclined side portions 23a and 23b of the connecting portion 23 are formed on the opposite side surfaces of the radiating fin 2, respectively. In the second embodiment, the configurations of the radiating fin 102 other than the shape thereof are the same as or similar to those of the first embodiment, and thus the same reference numerals are used, and description thereof is omitted.
(Radiating Fin)

Figure 13:
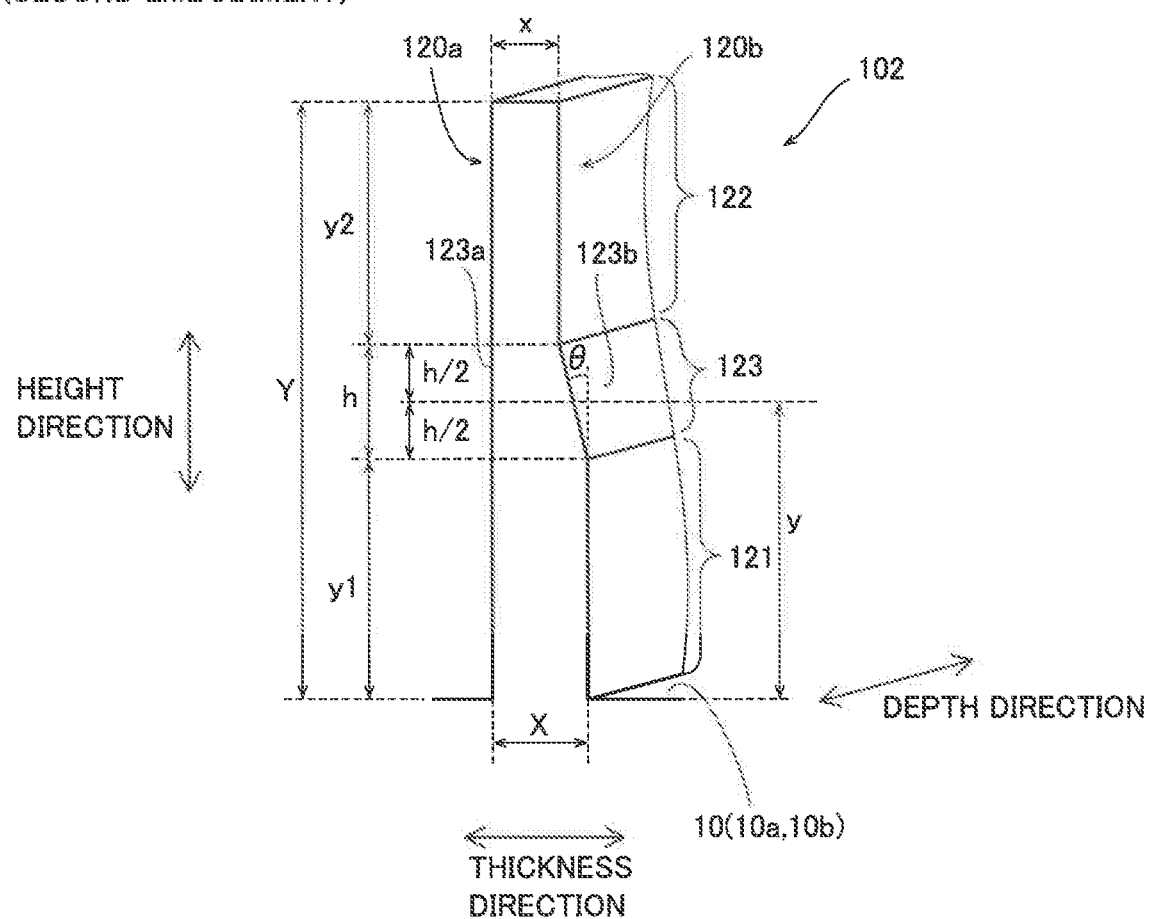
FIG. 13 A diagram for illustrating the shape of a radiating fin of a heat exchanger according to a second embodiment.

As shown in FIG. 13, the radiating fin 102 according to the second embodiment includes a first portion 121, a second portion 122, and a connecting portion 123. The radiating fin 102 has a shape in which one first portion 121 and one second portion 122 are connected to each other by one connecting portion 123. Each of the first portion 121 and the second portion 122 is a flat plate-shaped portion having a substantially constant thickness.

Note that, also in the second embodiment, the same reference numerals as those in the second embodiment are used for the dimensions of each portion of the radiating fin 102. That is, in the following description, the total height Y of the radiating fin 102 from a surface 10 of a core 1, the thickness X of the first portion 121, the thickness x of the second portion 122, and the length h of the connecting portion 123 in the height direction are used.

In the second embodiment, in the radiating fin 102, the side surface 120a on the first side is a flat surface, and the inclined side portion 123b of the connecting portion 123 is formed on the side surface 120b on the second side. In an example of FIG. 13, the side surface 120a on the left side (first side) in the figure is formed as a flat surface substantially parallel to the height direction. The inclined side portion 123b is formed on the side surface 120b on the right side (second side) in the figure.

Side portions of the first portion 121, the second portion 122, and the connecting portion 123 are formed in the same plane such that the side surface 120a on the first side becomes a flat surface that linearly rises from the surface 10. Therefore, in the thickness direction, the positions of the side portions of the first portion 121, the second portion 122, and the connecting portion 123 on the first side coincide with each other.

On the side surface 120b on the second side, the side portions of the first portion 121, the second portion 122, and the connecting portion 123 are formed at different positions in the thickness direction. The side portion of the first portion 121 on the second side is arranged at a position of a distance X from the side surface 120a, and the side portion of the second portion 122 on the second side is arranged at a position of a distance x from the side surface 120a. The inclined side portion 123b of the connecting portion 123 is inclined such that the thickness thereof decreases toward the second portion 122 by a difference between the thickness X of the first portion 121 and the thickness x of the second portion 122.

Thus, in the second embodiment, the radiating fin 102 includes the inclined side portion 123b only on the second side, and thus the radiating fin 102 does not have lateral symmetry but has a shape biased to the first side as a whole. The radiating fin 102 may have a shape symmetrical with the shape shown in FIG. 13 in the thickness direction. In other words, the inclined side portion 123b may be provided on the side surface 120a of the radiating fin 102 on the first side, and the side surface 120b on the second side may be a flat surface.
(Dimensional Relationship of Radiating Fin)

The relationship of the dimensions of each portion of the radiating fin 102 is now described.

FIGS. 14 to 19 show the calculation results of a simulation in which the improvement rate (increase rate) of the amount of heat exchange is calculated with each dimension of the radiating fin 102 as a variable parameter. The simulation calculation conditions in the second embodiment are the same as those in the first embodiment. In the first embodiment, comprehensive calculation was performed on three patterns of Y=10 [mm], 20 [mm], and 30 [mm] as the total height Y of the radiating fin 102 (CF), but in the second embodiment, calculation was performed on Y=20 [mm] as a representative value of the total height Y, and the improvement rate of the amount of heat exchange and a pressure loss were evaluated. Also in the second embodiment, a simulation was performed using a ratio y/Y, a ratio X/x, and a ratio h/Y as variable parameters.
<Formation Position of Connecting Portion>

The ratio y/Y (Feature 1) of the height y of the formation position of the connecting portion 123 to the total height Y is now described. In FIGS. 14 and 15, the ratio y/Y is set as a variable parameter, and the ratio X/x=2.2 and the ratio h/Y=0 are set as fixed parameters.

In the second embodiment, based on the calculation results of FIGS. 14 and 15, the radiating fin 102 is configured such that the ratio y/Y of the height y from the surface 10 of the core 1 to the formation position of the connecting portion 123 to the total height Y of the radiating fin 102 from the surface 10 of the core 1 satisfies a relationship of 0.34<y/Y<0.64, similarly to the first embodiment.

Specifically, in FIG. 14, the improvement rate is about 1.8% to about 3.4% within a range of 0.34<y/Y<0.64, and the improvement rate is maximized (about 3.4%) near the ratio y/Y=0.57. On the other hand, in a pressure loss ratio of FIG. 15, as the ratio y/Y increases, the pressure loss is minimized (about 0.985) near the ratio y/Y=0.44, and then gradually increases and becomes equivalent (about 1) to the comparative example at the ratio y/Y=0.64, and becomes larger than that of the comparative example when the ratio y/Y exceeds 0.64. Therefore, the ratio y/Y is set within 0.34<y/Y<0.64 such that the amount of heat exchange can be expected to be improved by about 1.8% or more without an increase in the pressure loss as compared with the comparative example.

Preferably, the ratio y/Y satisfies a relationship of 0.42<y/Y<0.64. In this case, the amount of heat exchange can be expected to be improved by about 3% or more without an increase in the pressure loss as compared with the comparative example.

<Thickness of Second Portion>

Figure 16:
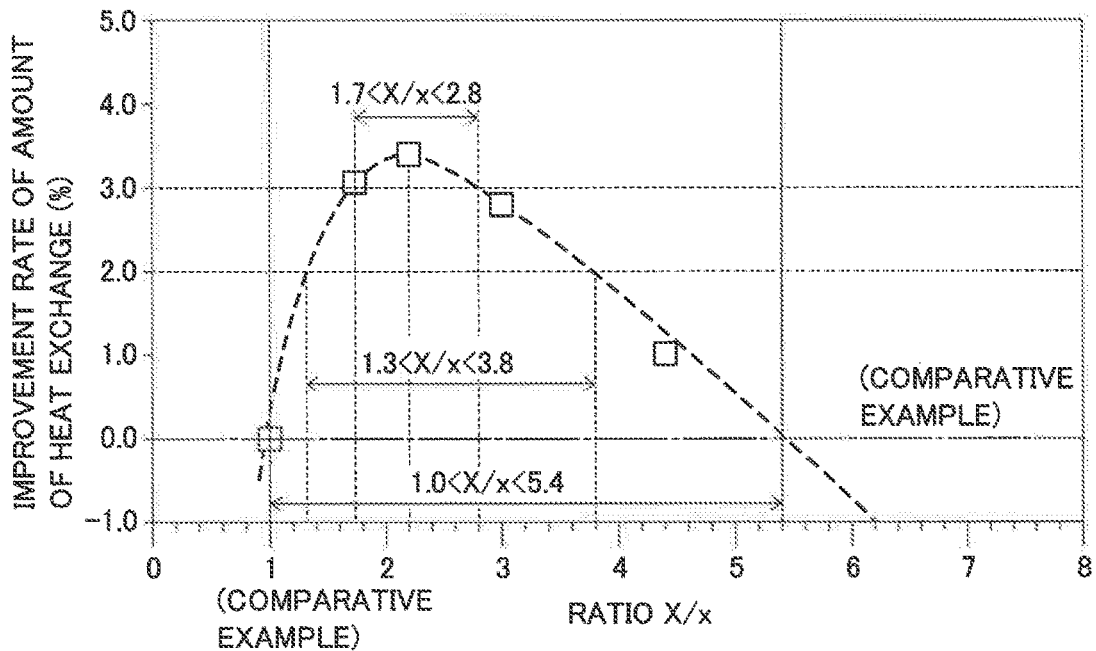
FIG. 16 Calculation results showing an improvement rate of the amount of heat exchange with respect to a ratio X/x of the radiating fin according to the second embodiment.
Figure 17:
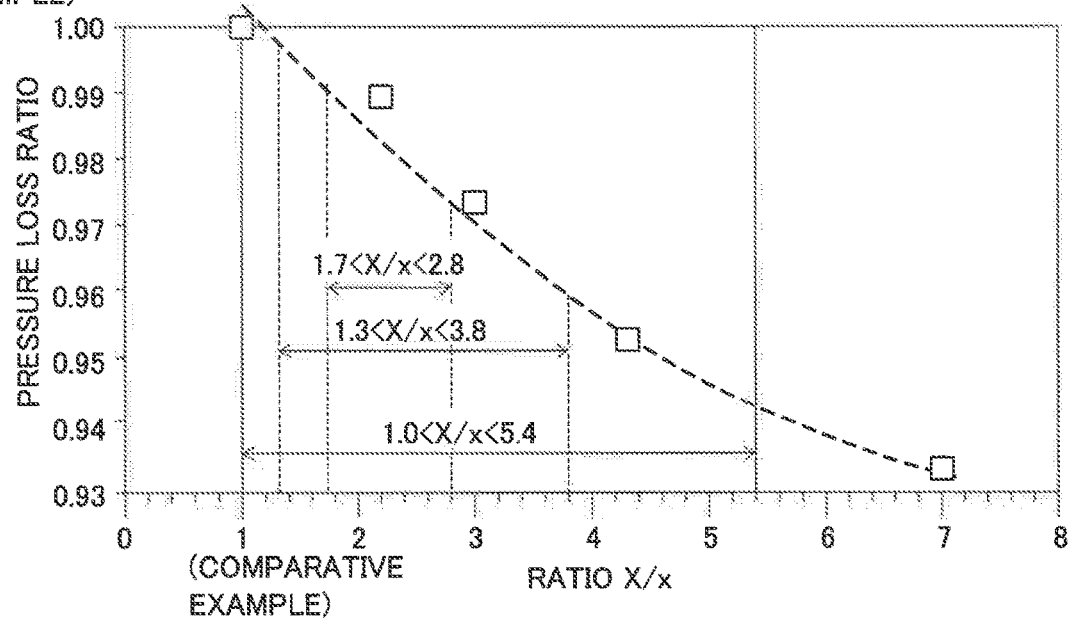
FIG. 17 Calculation results showing a pressure loss ratio with respect to the ratio X/x in FIG. 16.

The ratio X/x (Feature 2) of the thickness X of the first portion 121 to the thickness x of the second portion 122 is now described. FIGS. 16 and 17 show the improvement rate (FIG. 16) of the amount of heat exchange and a pressure loss ratio (FIG. 17) with respect to the comparative example in a case in which the ratio X/x is set as a variable parameter, and the ratio y/Y=0.5 and the ratio h/Y=0 are set as fixed parameters.

In the second embodiment, based on the calculation results of FIGS. 16 and 17, the radiating fin 102 is preferably configured such that the ratio X/x of the thickness X of the first portion 121 to the thickness x of the second portion 122 satisfies a relationship of 1.0<X/x<5.4, similarly to the first embodiment.

In FIG. 16, the improvement rate is maximized (about 3.4%) near the ratio X/x=2.2. The improvement rate tends to decrease from the ratio X/x=2.2 toward opposite sides. It can be seen that the improvement rate is about 0% at the ratio X/x=1 and the ratio X/x=5.4, and exceeds that of the comparative example within a range of 1.0<X/x<5.4. In the pressure loss ratio of FIG. 17, the pressure loss monotonically decreases as the ratio X/x increases from X/x=1.0. Therefore, when the ratio X/x is set within the range of 1.0<X/x<5.4, the amount of heat exchange can be expected to be improved without an increase in the pressure loss as compared with the comparative example.

Preferably, the ratio X/x satisfies a relationship of 1.3<X/x<3.8. In this case, the amount of heat exchange can be expected to be improved by about 2% or more without an increase in the pressure loss as compared with the comparative example. More preferably, the ratio X/x satisfies a relationship of 1.7<X/x<2.8. In this case, the amount of heat exchange can be expected to be improved by about 3% or more without an increase in the pressure loss as compared with the comparative example.

<Length of Connecting Portion>

The ratio h/Y (Feature 3) of the length h of the connecting portion 123 to the total height Y of the radiating fin 102 is now described. FIGS. 18 and 19 show the improvement rate (FIG. 18) of the amount of heat exchange and a pressure loss ratio (FIG. 19) with respect to the comparative example in a case in which the ratio h/Y is set as a variable parameter, and the ratio y/Y=0.5 and the ratio X/x=2.2 are set as fixed parameters.

In the second embodiment, based on the calculation results of FIG. 18, the radiating fin 102 is preferably configured such that the ratio h/Y of the length h of the connecting portion 123 of the radiating fin 102 in the height direction to the total height Y of the radiating fin 102 from the surface 10 of the core 1 satisfies a relationship of 0<h/Y<0.64, similarly to the first embodiment.

In FIG. 18, the improvement rate is maximized (about 3.8%) near the ratio h/Y=0.32. The improvement rate monotonically decreases from the ratio h/Y=0.32 toward opposite sides. It can be seen that the improvement rate of the amount of heat exchange of 3.3% or more can be obtained when the ratio h/Y is within a range of 0<h/Y<0.64. In a pressure loss ratio of FIG. 19, when the ratio h/Y is about 0.2, there is a decreasing peak (about 0.99), and when the ratio h/Y is within a range of 0<h/Y<0.64, the pressure loss is below that of the comparative example (=1.00). Therefore, the ratio h/Y is set to 0<h/Y<0.64 such that the amount of heat exchange can be expected to be improved by about 3.3% or more without an increase in the pressure loss as compared with the comparative example.

Preferably, the ratio h/Y satisfies a relationship of 0.20<h/Y<0.50. In this case, the amount of heat exchange can be expected to be improved by about 3.7% or more without an increase in the pressure loss as compared with the comparative example.

<Configuration Example of Radiating Fin>

FIGS. 20(A) to 20(D) show specific examples of the shape of the radiation fin 102 within each parameter range obtained from the above calculation results. A radiating fin 102a of FIG. 20(A) is configured so as to satisfy a relationship of the ratio y/Y=0.57, the ratio X/x=2.2, and the ratio h/Y=0.32. A radiating fin 102b in FIG. 20(B) is configured so as to satisfy a relationship of the ratio y/Y=0.35, the ratio X/x=1.3, and the ratio h/Y=0.10. A radiating fin 102c of FIG. 20(C) is configured so as to satisfy a relationship of the ratio y/Y=0.63, the ratio X/x=5.3, and the ratio h/Y=0.30. A radiating fin 102d in FIG. 20(D) is configured so as to satisfy a relationship of the ratio y/Y=0.42, the ratio X/x=3.8, and the ratio h/Y=0.63. Thus, the radiating fin 102 in the heat exchanger 200 according to the second embodiment may include various modified examples within the above parameter ranges for the parameters of the ratio y/Y, the ratio X/x, and the ratio h/Y.

Advantageous Effects of Second Embodiment

According to the second embodiment, the following advantageous effects are achieved.

According to the second embodiment, the radiating fin 102 is configured such that the ratio y/Y satisfies the relationship of 0.34<y/Y<0.64 based on the above simulation results (see FIGS. 14 and 15) similarly to the first embodiment. Accordingly, the improvement effect of the amount of heat exchange of about 2% or more (about 1.8% or more) can be achieved as compared with the radiating fin CF (see FIG. 11) having a rectangular cross-section with the same weight and the same height. Consequently, it is possible to meet the weight restrictions and the dimensional restrictions and improve (increase) the amount of heat exchange without an increase in the pressure loss.

When the radiating fin 2 is configured such that the ratio h/Y satisfies the relationship of 0.20<h/Y<0.50 based on the above simulation results (see FIGS. 18 and 19), the high improvement effect of the amount of heat exchange of about 3.7% to about 3.8% in the vicinity of the peak can be achieved without an increase in the pressure loss as compared with the radiating fin CF (see FIG. 11) having a rectangular cross-section with the same weight and the same height.

According to the second embodiment, the side surface 120a of the radiating fin 102 on the first side is a flat surface, and the inclined side portion 123*b* of the connecting portion 123 is formed on the side surface 120*b* of the radiating fin 102 on the second side. Accordingly, the side surface 120*a* of the radiating fin 102 on the first side can be formed as a simple flat surface similar to that of the radiating fin CF having a general rectangular cross-section. Furthermore, on the side surface 120*b* of the radiating fin 102 on the second side, the first portion 121 and the second portion 122 can be different from each other in thickness due to the inclined side portion 123*b*. In addition, skiving can be employed, for example, and thus it is possible to improve the easiness of working and ensure the degree of freedom in selecting a working method.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the heat exchanger is a surface cooler has been shown in each of the aforementioned first and second embodiments, the present invention is not restricted to this. The present invention only needs to be a heat exchanger for an aircraft engine, and may be applied to a plate-fin heat exchanger or a shell and tube heat exchanger other than a surface cooler. In that case, it is not necessary to provide the heat exchanger along the curved surface S in the aircraft engine, and the heat exchanger may be installed at a predetermined position in the engine or may be installed in a bypass flow path through which a branched portion of the airflow in the engine flows, for example.

While the example in which the fluid to be cooled is a lubricating oil of an engine or a lubricating oil of a generator, for example has been shown in each of the aforementioned first and second embodiments, the present invention is not restricted to this. The type of fluid to be cooled is not particularly limited. The fluid to be cooled may be any fluid.

While the example in which each of the plurality of radiating fins 2 (102) provided on the surface 10 of the core 1 has a predetermined shape as shown in FIG. 4 (FIG. 13) has been shown in each of the aforementioned first and second embodiments, the present invention is not restricted to this. In the present invention, all of the radiating fins do not need to have the same shape, but some of the radiating fins may have the same shape as that of the radiating fin CF according to the comparative example of FIG. 11. Furthermore, the parameters (the ratio y/Y, the ratio X/x, and the ratio h/Y) relating to the shape of the radiating fin do not need to be constant values, but the above parameters may be different for each one or more radiating fins.

While the example in which X/x=2.2 and h/Y=0 are used for the fixed parameters (the ratio X/x and the ratio h/Y) other than the ratio y/Y has been shown in FIG. 5, for example, the present invention is not restricted to this. In the present invention, as long as at least the ratio y/Y satisfies the relationship of 0.34<y/Y<0.64, the ratio X/x and the ratio h/Y may be any values. Therefore, as long as the ratio y/Y satisfies the relationship of 0.34<y/Y<0.64, the ratio X/x may be a value that does not satisfy 1.0<X/x<5.4. Alternatively, the ratio h/Y may be a value that does not satisfy 0.0<h/Y<0.64.

That is, the thickness x of the second portion 22 is smaller than the thickness X of the first portion 21, and thus the ratio X/x can be structurally within 1<X/x. The upper limit of the range of X/x depends on the limit of the practical working accuracy and the limit of the strength of the second portion 22. Therefore, as long as the ratio y/Y satisfies the relationship of 0.34<y/Y<0.64, the ratio X/x may be a value within a range of 5.4 X/x.

When the ratio h/Y=1 (h=Y), the first portion 21 and the second portion 22 are not formed, and thus the ratio h/Y can be structurally within h/Y<1. Therefore, as long as the ratio y/Y satisfies the relationship of 0.34<y/Y<0.64, the ratio h/Y may be a value within a range of 0.64<h/Y<1.

While the configuration example in which the radiating fin 2 (102) has a shape in which one first portion 21 (121) and one second portion 22 (122) are connected to each other by one connecting portion 23 (123) has been shown in each of the aforementioned first and second embodiments, the present invention is not restricted to this. In the present invention, a third portion, a fourth portion, . . . may be further provided via connecting portions on the tip side of the second portion 22 such that the radiating fin has a shape in which the thickness thereof is reduced in multiple steps. For example, when the first, second, and third portions are connected to each other by two connecting portions, the radiating fin has a shape in which the thickness thereof is reduced in two steps, and when the first, second, third, and fourth portions are connected to each other by three connecting portions, the radiating fin has a shape in which the thickness thereof is reduced in three steps. In that case, the height y of the formation position of each connecting portion is only required to satisfy a relationship of 0.34<y/Y<0.64.

While the configuration example in which the first portion 21 (121) and the second portion 22 (122) are both flat plate-shaped portions having substantially constant thicknesses (X and x) has been shown in each of the aforementioned first and second embodiments, the present invention is not restricted to this. In the present invention, the thicknesses of the first portion and the second portion may not be constant. For example, the first portion and the second portion may be tapered plate-shaped portions, the thicknesses of which decrease toward the tip side. In this case, the inclination angle of the side portion of the connecting portion may be different from the inclination angle of the side portions of the first portion and the second portion.

While the example in which the radiating fin 2 (102) has a shape that extends in the depth direction with the same sectional shape has been shown in each of the aforementioned first and second embodiments, the present invention is not restricted to this. In the present invention, the shape of the radiating fin at each position in the depth direction (the sizes of the first portion and the second portion and the position and range of the connecting portion) is not particularly limited. That is, the radiating fin (the first portion, the second portion, and the connecting portion) may be configured to have different sectional shapes depending on the position in the depth direction. Even in that case, the ratio y/Y is only required to satisfy a relationship of 0.34<y/Y<0.64 in the cross-section at any position in the depth direction.

Therefore, for example, the radiating fin 2 may be configured such that the height y of the formation position of the connecting portion 23 changes from the upstream side to the downstream side in the depth direction (airflow direction). That is, the height y may be increased (the ratio y/Y may be increased) or decreased (the ratio y/Y may be decreased) from the upstream side to the downstream side in the depth direction.

Alternatively, the radiating fin may be configured such that the thickness x of the second portion 22 or the thickness X of the first portion 21 (the ratio X/x) changes from the upstream side to the downstream side in the depth direction (airflow direction). For example, one or both of the thickness x and the thickness X may be increased (or decreased) from the upstream side to the downstream side in the depth direction. In this case, the value of the ratio X/x may change along the depth direction, or the thickness x and the thickness X may change while keeping the ratio X/x constant.

DESCRIPTION OF REFERENCE NUMERALS

1: core
2 (2a-2d), 102 (102a-102d): radiating fin
10: surface of the core
10a: first surface
10b: second surface
20a, 20b: side surface
21, 121: first portion
22, 122: second portion
23, 123: connecting portion
23a, 23b, 123b: inclined side portion
100, 200: heat exchanger (heat exchanger for an aircraft engine)
H: length of the connecting portion
S: curved surface
X: thickness of the first portion
x: thickness of the second portion
Y: total height of the radiating fin
y: height of the formation position of the connecting portion

The invention claimed is:

1. A heat exchanger for an aircraft engine configured to perform heat exchange with an airflow in the aircraft engine, the heat exchanger comprising:
a core allowing a fluid to be cooled to flow therethrough; and
a plurality of plate-shaped radiating fins on a surface of the core; wherein each of the radiating fins includes:
a first portion being formed on the surface of the core and being a flat plate-shaped portion having a generally constant thickness;
a second portion being arranged on a tip side relative to the first portion, having a thickness smaller than that of the first portion, and being a flat plate-shaped portion having a generally constant thickness; and
a connecting portion being connected between the first portion and the second portion, a side portion of the connecting portion being inclined with respect to a side portion of the first portion and a side portion of the second portion; and
the radiating fins are formed such that a ratio y/Y of a height y from the surface of the core to a formation position of the connecting portion to a total height Y of each of the radiating fins from the surface of the core satisfies a relationship of 0.34<y/Y<0.64.

2. The heat exchanger for the aircraft engine according to claim 1, wherein the radiating fins are formed such that a ratio X/x of a thickness X of the first portion to a thickness x of the second portion satisfies a relationship of 1.0<X/x<5.4.

3. The heat exchanger for the aircraft engine according to claim 1, wherein the radiating fins are formed such that a ratio h/Y of a length h of the connecting portion, which is inclined, in a height direction of the radiating fins to the total height Y of each of the radiating fins from the surface of the core satisfies a relationship of 0<h/Y<0.64.

4. The heat exchanger for an aircraft engine according to claim 1, wherein each of the radiating fins has a flat side surface on a first side, and an inclined side portion of the connecting portion on a side surface on a second side.

5. The heat exchanger for an aircraft engine according to claim 4, wherein the radiating fins are configured such that a ratio h/Y of a length h of the connecting portion, which is inclined, in a height direction of the radiating fins to the total height Y of each of the radiating fins from the surface of the core satisfies a relationship of 0.20<h/Y<0.50.

6. The heat exchanger for the aircraft engine according to claim 1, wherein each of the radiating fins includes inclined side portions of the connecting portion on opposite side surfaces, respectively.

7. The heat exchanger for the aircraft engine according to claim 6, wherein the radiating fins are formed such that a ratio h/Y of a length h of the connecting portion, which is inclined, in a height direction of the radiating fins to the total height Y of each of the radiating fins from the surface of the core satisfies a relationship of 0<h/Y<0.40.

8. The heat exchanger for the aircraft engine according to claim 1, wherein each of the radiating fins has a shape in which the first portion and the second portion are connected to each other by the connecting portion which is single.

9. The heat exchanger for the aircraft engine according to claim 1, wherein
the core has a curved shape along a curved surface in the aircraft engine, and has a hollow plate shape including a first surface that faces the curved surface and a second surface opposite to the first surface; and
the plurality of radiating fins are provided on at least one of the first surface and the second surface.

10. The heat exchanger for the aircraft engine according to claim 1, wherein the formation position is a center position of the inclined connecting portion in a height direction thereof.

11. The heat exchanger for the aircraft engine according to claim 10, wherein the height direction is a direction in which the radiating fin protrudes from the surface of the core.

* * * * *